United States Patent
Nakajima

(10) Patent No.: US 7,423,787 B2
(45) Date of Patent: Sep. 9, 2008

(54) OPTICAL SCANNING MODULE, DEVICE, AND METHOD, AND IMAGING APPARATUS

(75) Inventor: Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1219 days.

(21) Appl. No.: 10/084,485

(22) Filed: Feb. 28, 2002

(65) Prior Publication Data

US 2002/0122217 A1 Sep. 5, 2002

(30) Foreign Application Priority Data

| Mar. 1, 2001 | (JP) | ............................. 2001-056304 |
| Mar. 16, 2001 | (JP) | ............................. 2001-077089 |
| Sep. 25, 2001 | (JP) | ............................. 2001-292586 |

(51) Int. Cl.
*H04N 1/04* (2006.01)
*H04N 1/46* (2006.01)

(52) U.S. Cl. ..................... 358/483; 358/481; 358/511

(58) Field of Classification Search ............... 347/239, 347/255, 256; 359/202, 72; 235/462.43; 358/483, 293, 481, 511; 250/235–236
See application file for complete search history.

(56) References Cited

U.S. PATENT DOCUMENTS

| 4,586,057 A | * | 4/1986 | Schoon .................... 347/250 |
| 4,726,640 A | | 2/1988 | Iwama et al. |
| 4,760,251 A | * | 7/1988 | Shimada et al. ............ 250/235 |
| 4,953,961 A | * | 9/1990 | Ubhayakar ................ 359/223 |
| 5,017,987 A | | 5/1991 | Nanjoh et al. |
| 5,069,515 A | | 12/1991 | Itami et al. |
| 5,108,843 A | | 4/1992 | Ohtaka et al. |
| 5,304,357 A | | 4/1994 | Sato et al. |
| 5,408,113 A | | 4/1995 | Kanno et al. |
| 5,448,113 A | | 9/1995 | Suzuki et al. |
| 5,453,650 A | | 9/1995 | Hashimoto et al. |
| 5,508,477 A | | 4/1996 | Kato et al. |
| 5,510,664 A | | 4/1996 | Suzuki et al. |
| 5,574,591 A | | 11/1996 | Suzuki et al. |
| 5,596,442 A | * | 1/1997 | Plesko ...................... 359/199 |
| 5,606,448 A | | 2/1997 | Suzuki et al. |
| 5,612,599 A | | 3/1997 | Itami et al. |
| 5,633,523 A | | 5/1997 | Kato |
| 5,633,744 A | | 5/1997 | Nakajima |

(Continued)

FOREIGN PATENT DOCUMENTS

| JP | 2722314 | 11/1997 |

(Continued)

OTHER PUBLICATIONS

U.S. Appl. No. 11/609,098, filed Dec. 11, 2006, Nakajima.

(Continued)

*Primary Examiner*—Houshang Safaipour
(74) *Attorney, Agent, or Firm*—Oblon, Spivak, McClelland, Maier & Neustadt, P.C.

(57) ABSTRACT

An optical scanning module includes a light-emission source emitting a light beam, a movable mirror reflecting the light beam, and a movable mirror driving part that causes the movable mirror to oscillate in first and second opposite directions. A frequency of pixel information supplied to the light-emission source varies in accordance with a primary scanning position of each of pixels.

91 Claims, 27 Drawing Sheets

U.S. PATENT DOCUMENTS

| | | | |
|---|---|---|---|
| 5,668,413 | A | 9/1997 | Nanjo |
| 5,726,699 | A | 3/1998 | Itami et al. |
| 5,739,602 | A | 4/1998 | Suzuki et al. |
| 5,751,465 | A * | 5/1998 | Melville et al. ............. 359/213 |
| 5,753,907 | A | 5/1998 | Nakajima et al. |
| 5,767,955 | A * | 6/1998 | Konno et al. ............... 356/73.1 |
| 5,769,544 | A | 6/1998 | Suzuki et al. |
| 5,786,594 | A | 7/1998 | Ito et al. |
| 5,793,408 | A | 8/1998 | Nakajima |
| 5,811,353 | A | 9/1998 | Nanjo |
| 5,909,966 | A | 6/1999 | Suzuki et al. |
| 5,936,756 | A | 8/1999 | Nakajima |
| 5,969,844 | A | 10/1999 | Itami et al. |
| 5,999,345 | A | 12/1999 | Nakajima et al. |
| 6,052,211 | A | 4/2000 | Nakajima |
| 6,091,534 | A | 7/2000 | Nakajima |
| 6,150,698 | A | 11/2000 | Ohtsuka et al. |
| 6,150,779 | A | 11/2000 | Itami et al. |
| 6,185,026 | B1 | 2/2001 | Hayashi et al. |
| 6,198,562 | B1 | 3/2001 | Hayashi et al. |
| 6,215,974 | B1 | 4/2001 | Katoh et al. |
| 6,281,609 | B1 | 8/2001 | Itami et al. |
| 6,312,108 | B1 | 11/2001 | Kato |
| 6,317,246 | B1 | 11/2001 | Hayashi et al. |
| 6,324,149 | B1 | 11/2001 | Mifune et al. |
| 6,332,669 | B1 | 12/2001 | Kato et al. |
| 6,367,914 | B1 | 4/2002 | Ohtaka et al. |
| 6,381,057 | B1 | 4/2002 | Itabashi |
| 6,388,697 | B1 * | 5/2002 | Sonehara et al. ............. 347/239 |
| 6,400,391 | B1 | 6/2002 | Suhara et al. |
| 6,400,917 | B2 | 6/2002 | Nakazato et al. |
| 6,429,956 | B2 | 8/2002 | Itabashi |
| 6,462,853 | B2 | 10/2002 | Hayashi |
| 6,465,918 | B1 | 10/2002 | Itami et al. |
| 6,469,772 | B1 | 10/2002 | Itabashi |
| 2001/0035460 | A1 * | 11/2001 | Nakajima et al. ...... 235/462.43 |
| 2002/0122217 | A1 | 9/2002 | Nakajima |
| 2002/0149776 | A1 * | 10/2002 | Braun et al. ................ 356/451 |
| 2002/0191230 | A1 * | 12/2002 | Ouchi et al. ................ 358/483 |

FOREIGN PATENT DOCUMENTS

| | | |
|---|---|---|
| JP | 3011144 | 12/1999 |
| JP | 2001-208996 | 8/2001 |
| JP | 2001-228428 | 8/2001 |

OTHER PUBLICATIONS

U.S. Appl. No. 11/765,166, filed Jun. 19, 2007, Nakajima.
U.S. Appl. No. 09/915,877, filed Jul. 26, 2001, Katoh.
U.S. Appl. No. 10/160,153, filed Jun. 24, 2002, Ueda.
U.S. Appl. No. 09/113,638, filed Jul. 10, 1998, Katoh et al.
U.S. Appl. No. 09/988,147, filed Nov. 19, 2001, Ohtaka.
U.S. Appl. No. 10/050,865, filed Jan. 18, 2002, Ohtaka et al.
U.S. Appl. No. 10/084,485, filed Feb. 28, 2002, Nakajima.
U.S. Appl. No. 10/294,033, filed Nov. 14, 2002, Nanjyo et al.
U.S. Appl. No. 11/282,655, filed Nov. 21, 2005, Saitoh.
U.S. Appl. No. 09/552,657, filed Apr. 19, 2000, Pending.
U.S. Appl. No. 09/653,330, filed Aug. 31, 2000, Pending.
U.S. Appl. No. 09/769,510, filed Jan. 26, 2001, Pending.
U.S. Appl. No. 09/827,097, filed Apr. 6, 2001, Pending.
U.S. Appl. No. 09/833,821, filed Apr. 13, 2001, Pending.
U.S. Appl. No. 09/910,797, filed Jul. 24, 2001, Pending.
U.S. Appl. No. 09/946,665, filed Sep. 6, 2001, Pending.
U.S. Appl. No. 09/888,600, filed Jun. 26, 2001, Andoh et al.
U.S. Appl. No. 09/984,236, filed Oct. 29, 2001, Masuda et al.
U.S. Appl. No. 10/102,633, filed Mar. 22, 2002, Ameyama et al.
U.S. Appl. No. 10/161,659, filed Jun. 5, 2002, Suzuki et al.
U.S. Appl. No. 10/161,756, filed Jun. 5, 2002, Atsuumi et al.
U.S. Appl. No. 10/183,748, filed Jun. 28, 2002, Nihei et al.
U.S. Appl. NO. 10/207,241, filed Jul. 30, 2002, Suzuki et al.
U.S. Appl. No. 10/200,778, filed Jul. 24, 2002, Amada et al.
U.S. Appl. No. 10/319,624, filed Dec. 16, 2002, Ono et al.
U.S. Appl. No. 11/037,132, filed Jan. 19, 2002, Nakajima.
U.S. Appl. No. 11/058,673, filed Feb. 16, 2005, Imai et al.
U.S. Appl. No. 10/375,036, filed Feb. 28, 2003, Suzuki et al.
U.S. Appl. No. 12/028,446 filed Feb. 8, 2008, Nakamura et al.
U.S. Appl. No. 10/382,489, filed Mar. 7, 2003, Takanashi et al.
U.S. Appl. No. 10/386,654, filed Mar. 13, 2003, Amada et al.
US. Appl. No. 10/084,485, filed Feb. 28, 2002, Nakajima.
U.S. Appl. No. 10/083,991, filed Mar. 19, 2004, Nakajima et al.
U.S. Appl. No. 10/395,128, filed Mar. 25, 2003, Hayashi et al.
U.S. Appl. No. 11/102,658, filed Apr. 11, 2005, Fujii et al.
U.S. Appl. No. 10/820,733, filed Apr. 9, 2004, Suhara et al.
U.S. Appl. No. 10/367,706, filed Feb. 19, 2003, Fujii et al.
U.S. Appl. No. 10/382,530, filed Mar. 7, 2003, Hayashi et al.
U.S. Appl. No. 10/878,365, filed Jun. 29, 2004, Nakajima.
U.S. Appl. No. 10/609,577, filed Jul. 1, 2003, Nakajima et al.
U.S. Appl. No. 10/642,173, filed Aug. 18, 2003, Ono et al.
U.S. Appl. No. 09/633,867, filed Aug. 7, 2000, Pending.
U.S. Appl. NO. 09/949,651, filed Sep. 12, 2001, Pending.
U.S. Appl. No. 10/047,698, filed Jan. 18, 2002, Pending.
U.S. Appl. No. 10/096,250, filed Mar. 13, 2002, Pending.
U.S. Appl. No. 10/226,344, filed Aug. 23, 2002, Pending.
U.S. Appl. No. 10/127,768, filed Apr. 23, 2002, Nakajimo.
U.S. Appl. No. 09/922,010, filed Aug. 3, 2002, Irinoda et al.
U.S. Appl. No. 09/632,046, filed Aug. 3, 2000, Kato et al.
U.S. Appl. No. 09/538,508, filed Mar. 30, 2000, Shimada et al.
U.S. Appl. No. 09/765,608, filed Jan. 22, 2001, Hayashi et al.
U.S. Appl. No. 09/860,520, filed Mar. 21, 2001, Hayashi.
U.S. Appl. No. 09/968,546, filed Oct. 2, 2001, Hayashi et al.
U.S. Appl. No. 09/982,831, filed Oct. 22, 2001, Hayashi et al.
U.S. Appl. No. 10/028,698, filed Dec. 28, 2001, Hayashi.
U.S. Appl. No. 10/085,707, filed Mar. 1, 2002, Hayashi et al.
U.S. Appl. No. 10/101,937, filed Mar. 21, 2002, Hayashi.
U.S. Appl. No. 10/143,013, filed Mar. 13, 2002, Suhara et al.
U.S. Appl. No. 10/223,294, filed Aug. 20, 2002, Satoh et al.
U.S. Appl. No. 10/941,849, filed Sep. 16, 2004, Nakajima.
U.S. Appl. No. 09/946,482, filed Sep. 6, 2001, Ohashi et al.
U.S. Appl. No. 09/955,181, filed Sep. 19, 2001, Suzuki et al.
U.S. Appl. No. 09/715,151, filed Nov. 20, 2000, Itabashi.
U.S. Appl. No. 09/788,415, filed Feb. 21, 2001, Sakai et al.
U.S. Appl. No. 09/797,563, filed Mar. 5, 2001, Kawamura.
U.S. Appl. No. 09/810,184, filed Mar. 19, 2001, Itabashi.
U.S. Appl. No. 09/816,378, filed Mar. 26, 2001, Suzuki et al.
U.S. Appl. No. 09/873,256, filed Jun. 5, 2001, Ema et al.
U.S. Appl. No. 09/985,753, filed Nov. 6, 2001, Kawamura.
U.S. Appl. No. 10/059,371, filed Jan. 31, 2002, Ono.
U.S. Appl. No. 10/047,092, filed Jan. 17, 2002, Atsuumi.
U.S. Appl. No. 10/247,702, filed Sep. 20, 2002, Hayashi et al.
U.S. Appl. No. 10/242,710, filed Sep. 13, 2002, Pending.

* cited by examiner

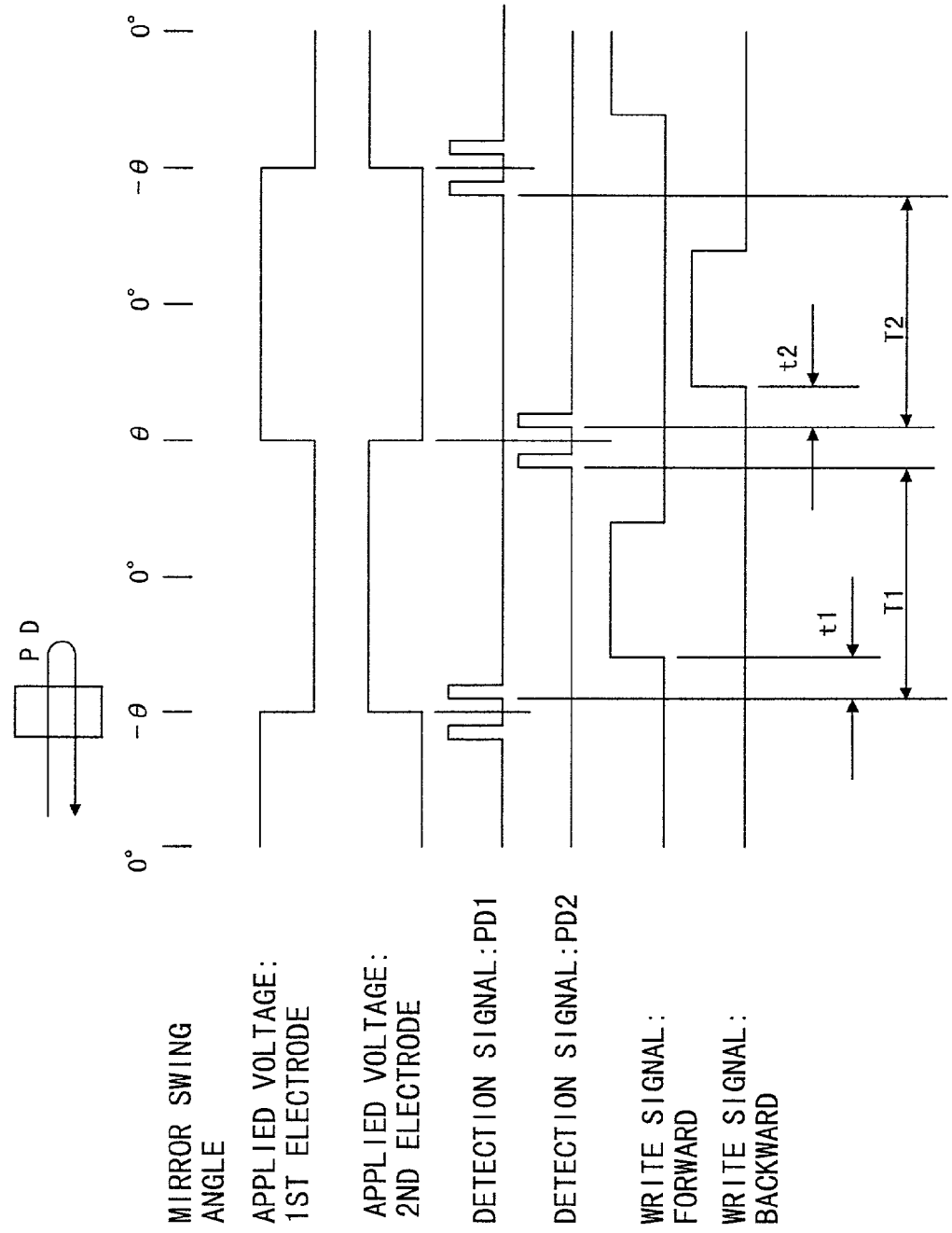

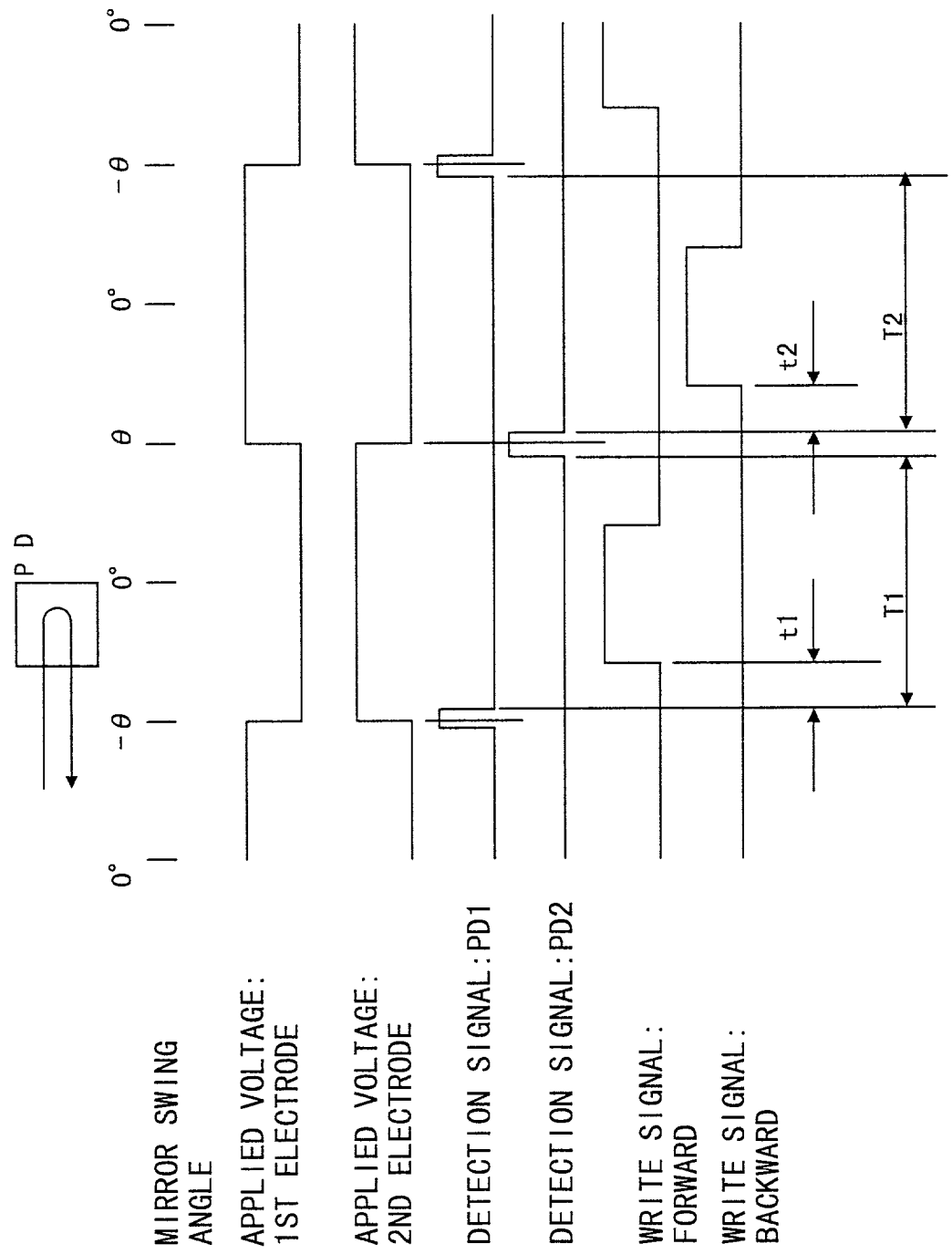

OPTICAL SCANNING MODULE, DEVICE, AND METHOD, AND IMAGING APPARATUS

BACKGROUND OF THE INVENTION

1. Field of the Invention

The present invention relates to an optical scanning module, device, and method, and an imaging apparatus.

2. Description of the Related Art

Conventional optical scanning devices employ polygon or galvano-mirrors as deflectors deflecting light beams for scanning. In order to realize an image of a higher resolution and to achieve higher-speed printing, it is necessary to rotate the deflector at a higher rate, which, however, entails a problem of bearing durability or a problem of heat generation or noise caused by windage. This sets a limit to high-speed scanning.

On the other hand, recently, researches on an optical deflector using silicon micromachining have made progress, so that such an optical deflector formed by integrally forming a movable mirror and torsion bars supporting the movable mirror of a semiconductor substrate as disclosed in Japanese Patent No. 2722314 or No. 3011144 has been proposed. The optical deflector disclosed in Japanese Patent No. 2722314 or No. 3011144, which oscillates back and forth using resonance, is therefore operable at a high speed. Further, since the torsion bars of single-crystal silicon are degradation-free, the above-described optical deflector is excellent in high-speed scanning.

The above-described optical deflector gains amplitude by using resonance, thus having the advantage of extremely small power consumption and reduced noise compared with the conventional polygon or galvano-mirror. However, in the case of scanning a surface with a deflected light beam, the above-described optical deflector is moved in the other direction at each end of a scanning line so that a scanning rate is 0 at each end of the scanning line and is maximized at the center thereof, thus having a great variation. Therefore, it is difficult to correct an optical scanning device using the above-described optical deflector with a scanning lens so that scanning is performed at a constant rate on a scanned surface as in the conventional optical scanning device using the polygon mirror.

As will be described later, a maximum swing angle $\theta 0$ is inversely related to a resonant frequency fd. As a recording rate becomes higher, the maximum swing angle $\theta 0$ becomes smaller. In practice, the maximum swing angle $\theta 0$ becomes equal to or smaller than $10°$.

Since the scanning rate decreases at an accelerating pace as the swing angle of the movable mirror becomes greater, the movable mirror may be used with the range of a variation in the scanning rate being set relatively narrow by limiting a swing angle $\theta s$ used for image recording with respect to the maximum swing angle $\theta 0$. However, this incurs reduction in an image recording region, causing a problem that a ratio of the swing angle $\theta s$ used for image recording to the maximum swing angle $\theta 0$, that is, an effective scanning rate $\theta s/\theta 0$, becomes low.

The galvano-mirror has a movable coil turnably supported in a magnetic field. The movable mirror is turned in opposite directions by using the equilibrium of the rotational torque of an electromagnetic force and a return spring, the electromagnetic force being generated in the movable coil by supplying an electric current thereto. Compared with the polygon mirror, the galvano-mirror is simple in configuration and small in size.

As previously described, with the recent development of micromachining, a galvano-mirror having a movable mirror and torsion bars supporting the movable mirror formed integrally with each other in a Si substrate has been proposed as disclosed in Japanese Patent No. 2722314. Further, a method of oscillating a movable mirror by using an electrostatic attraction is disclosed in Japanese Patent No. 3011144. According to these inventions, high-speed and highly productive deflectors can be obtained.

Such a movable mirror formed on a Si substrate can cause a light beam to perform scanning at a higher rate than the polygon mirror by matching the frequency of attraction or a repulsive force given to the movable mirror with the natural frequency thereof so that the movable mirror oscillates by resonance.

The swing angle $\theta$ of the movable mirror is given by:

$$\theta = T/K (K = G \cdot I/L)$$

where G is the modulus of elasticity, I is the geometrical moment of inertia, L is the length, K is the spring constant determined by the length L, and T is the torque given by the electrostatic attraction of torsion bars supporting the movable mirror.

Further, the resonant frequency $\phi$ of the movable mirror is given by the following expression:

$$\phi = (K/J)^{1/2}$$

where J is the moment of inertia.

The speed or the resonance frequency and the swing angle $\theta$ of the movable mirror are inversely related. Generally, the swing angle $\theta$ is smaller than or equal to approximately $10°$, so that it is difficult for the movable mirror to achieve as large a scanning angle as the polygon mirror (approximately $40°$) in terms of its physical property. Therefore, in order to secure a recording width as s substitute for the polygon mirror, it is necessary for the movable mirror to have a large optical path length (a distance between a deflection surface and a scanned surface). This enlarges the size of the entire optical scanning device employing the movable mirror, which is minute as a deflector.

SUMMARY OF THE INVENTION

It is a general object of the present invention to provide an optical scanning module, device, and method, and an imaging apparatus in which the above-described disadvantages are eliminated.

A more specific object of the present invention is to provide an optical scanning module, device, and method, and an imaging apparatus by which image recording can be performed efficiently with an increased effective scanning rate and applied power can be reduced to lower power consumption with a reduced maximum swing angle.

Another more specific object of the present invention is to provide an optical scanning device and an imaging apparatus that employ a downsized high-speed movable mirror oscillating by resonant oscillation and can benefit from the merit thereof, and can obtain good image quality by low-power high-speed recording.

The above objects of the present invention are achieved by an optical scanning module including a light-emission source emitting a light beam, a movable mirror reflecting the light beam, and a movable mirror driving part that causes the movable mirror to oscillate in first and second opposite directions, wherein a frequency of pixel information supplied to the light-emission source varies in accordance with a primary scanning position of each of pixels.

The above objects of the present invention are also achieved by an optical scanning module including a light-emission source emitting a light beam, a movable mirror reflecting the light beam, and a movable mirror driving part that causes the movable mirror to oscillate in first and second opposite directions, wherein a frequency causing the light-emission source to emit light based on pixel information varies in accordance with a primary scanning position.

The above objects of the present invention are also achieved by an optical scanning module including a light-emission source emitting a light beam, a movable mirror reflecting the light beam, a movable mirror driving part that causes the movable mirror to oscillate in first and second opposite directions, and a variable frequency setting part varying, in accordance with an amplitude of the movable mirror, a frequency causing the light-emission source to emit light based on pixel information.

According to any of the above-described optical scanning modules, image recording can be performed efficiently with an increased effective scanning rate and applied power can be reduced to lower power consumption with a reduced maximum swing angle.

The above objects of the present invention are also achieved by an optical scanning module including a light-emission source emitting a light beam, a movable mirror reflecting the light beam, and a movable mirror driving part that causes the movable mirror to oscillate in first and second opposite directions, wherein a light emission period forming one pixel on a scanned surface is varied with respect to a primary scanning direction to be minimized in a vicinity of a center of an image so that a light-emission interval between each of pixels forming pixel information is minimized in the vicinity of the center of the image.

According to the above-described optical scanning module, a correction of a scanning speed on a scanned surface by a scanning lens can be reduced and an angle of field for image recording can be widened, thus shortening an optical path length. Thereby, the optical scanning module is downsized.

The above objects of the present invention are also achieved by an optical scanning device including a plurality of optical scanning modules arranged so that primary scanning directions thereof coincide with each other, the optical scanning modules each including a light-emission source emitting a light beam, a movable mirror reflecting the light beam, and a movable mirror driving part that causes the movable mirror to oscillate in first and second opposite directions, wherein a frequency of pixel information supplied to the light-emission source varies in accordance with a primary scanning position of each of pixels.

The above objects of the present invention are also achieved by an optical scanning device including a plurality of optical scanning modules arranged so that primary scanning directions thereof coincide with each other, the optical scanning modules each including a light-emission source emitting a light beam, a movable mirror reflecting the light beam, and a movable mirror driving part that causes the movable mirror to oscillate in first and second opposite directions, wherein a frequency causing the light-emission source to emit light based on pixel information varies in accordance with a primary scanning position.

The above objects of the present invention are also achieved by an optical scanning device including a plurality of optical scanning modules arranged so that primary scanning directions thereof coincide with each other, the optical scanning modules each including a light-emission source emitting a light beam, a movable mirror reflecting the light beam, and a movable mirror driving part that causes the movable mirror to oscillate in first and second opposite directions, and a variable pixel frequency setting part varying, in accordance with an amplitude of the movable mirror, a frequency causing the light-emission source to emit light based on pixel information.

The above objects of the present invention are also achieved by an optical scanning device including a plurality of optical scanning modules arranged so that primary scanning directions thereof coincide with each other, the optical scanning modules each including a light-emission source emitting a light beam, a movable mirror reflecting the light beam, and a movable mirror driving part that causes the movable mirror to oscillate in first and second opposite directions, wherein a light emission period forming one pixel on a scanned surface is varied with respect to a primary scanning direction to be minimized in a vicinity of a center of an image so that a light-emission interval between each of pixels forming pixel information is minimized in the vicinity of the center of the image.

The above objects of the present invention are also achieved by an optical scanning device including a plurality of optical scanning modules arranged so that primary scanning directions thereof coincide with each other, the optical scanning modules each including a light-emission source emitting a light beam, a movable mirror reflecting the light beam, and a movable mirror driving part that causes the movable mirror to oscillate in first and second opposite directions, wherein control is performed so that a termination end of one of images formed by scanning by the light beams of the optical scanning modules coincides with a starting end of an adjacent one of the images.

According to any of the above-described optical scanning devices, the image recording widths of the optical scanning modules are combined to form a larger image recording width for any of the optical scanning devices so that images of a variety of recording widths can be formed.

The above objects of the present invention are also achieved by an imaging apparatus including an optical scanning device that includes a plurality of optical scanning modules arranged so that primary scanning directions thereof coincide with each other, the optical scanning modules each including a light-emission source emitting a light beam, a movable mirror reflecting the light beam, and a movable mirror driving part that causes the movable mirror to oscillate in first and second opposite directions, wherein a frequency of pixel information supplied to the light-emission source varies in accordance with a primary scanning position of each of pixels and an electrostatic image is formed on an image holding body by dividing an image region thereon in the primary scanning direction of each of the optical scanning modules and is made visible by toner to be transferred onto an output sheet of paper.

The above objects of the present invention are also achieved by an imaging apparatus including an optical scanning device that includes a plurality of optical scanning modules arranged so that primary scanning directions thereof coincide with each other, the optical scanning modules each including a light-emission source emitting a light beam, a movable mirror reflecting the light beam, and a movable mirror driving part that causes the movable mirror to oscillate in first and second opposite-directions, wherein a frequency causing the light-emission source to emit light based on pixel information varies in accordance with a primary scanning position and an electrostatic image is formed on an image holding body by dividing an image region thereon in the primary scanning direction of each of the optical scanning modules and is made visible by toner to be transferred onto an output sheet of paper.

The above objects of the present invention are also achieved by an imaging apparatus including an optical scanning device that includes a plurality of optical scanning modules arranged so that primary scanning directions thereof coincide with each other, the optical scanning modules each including a light-emission source emitting a light beam, a movable mirror reflecting the light beam, and a movable mirror driving part that causes the movable mirror to oscillate in first and second opposite directions, and a variable pixel frequency setting part varying, in accordance with an amplitude of the movable mirror, a frequency causing the light-emission source to emit light based on pixel information, wherein an electrostatic image is formed on an image holding body by dividing an image region thereon in the primary scanning direction of each of the optical scanning modules and is made visible by toner to be transferred onto an output sheet of paper.

The above objects of the present invention are also achieved by an imaging apparatus including an optical scanning device that includes a plurality of optical scanning modules arranged so that primary scanning directions thereof coincide with each other, the optical scanning modules each including a light-emission source emitting a light beam, a movable mirror reflecting the light beam, and a movable mirror driving part that causes the movable mirror to oscillate in first and second opposite directions, wherein a light emission period forming one pixel on a scanned surface is varied with respect to a primary scanning direction to be minimized in a vicinity of a center of an image so that a light-emission interval between each of pixels forming pixel information is minimized in the vicinity of the center of the image and an electrostatic image is formed on an image holding body by dividing an image region thereon in the primary scanning direction of each of the optical scanning modules and is made visible by toner to be transferred onto an output sheet of paper.

The above objects of the present invention are also achieved by an imaging apparatus including an optical scanning device that includes a plurality of optical scanning modules arranged so that primary scanning directions thereof coincide with each other, the optical scanning modules each including a light-emission source emitting a light beam, a movable mirror reflecting the light beam, and a movable mirror driving part that causes the movable mirror to oscillate in first and second opposite directions, wherein control is performed so that a termination end of one of images formed by scanning by the light beams of the optical scanning modules coincides with a starting end of an adjacent one of the images, and an electrostatic image is formed on an image holding body by dividing an image region thereon in the primary scanning direction of each of the optical scanning modules and is made visible by toner to be transferred onto an output sheet of paper.

According to any of the above-described imaging apparatuses, power saving and noise reduction can be realized.

The above objects of the present invention are also achieved by an optical scanning method employing an optical scanning device that causes a light beam emitted from a light-emission source to perform scanning by deflecting the light beam by a movable mirror oscillating in first and second opposite directions in a resonant state, wherein image writing is performed by selecting, in accordance with a resonant frequency of the movable mirror, a reference frequency causing the light-emission source to emit light based on pixel information.

The above objects of the present invention are also achieved by an optical scanning method employing an optical scanning device that causes a light beam emitted from a light-emission source to perform scanning by deflecting the light beam by a movable mirror oscillating in first and second opposite directions in a resonant state, wherein image writing is performed by supplying the light-emission source with pixel information whose frequency is varied in accordance with a primary scanning position of each of pixels.

The above objects of the present invention are also achieved by an optical scanning method employing an optical scanning device that causes a light beam emitted from a light-emission source to perform scanning by deflecting the light beam by a movable mirror oscillating in first and second opposite directions in a resonant state, the optical scanning method including the steps of (a) detecting an oscillation displacement of the movable mirror, (b) setting a frequency variation section based on a detection signal obtained by the step (a), and (c) performing image writing while varying, step by step from a reference frequency in the frequency variation section, a frequency causing the light-emission source to emit light based on pixel information.

According to any of the above-described methods, image recording can be performed efficiently with an increased effective scanning rate and applied power can be reduced to lower power consumption with a reduced maximum swing angle.

BRIEF DESCRIPTION OF THE DRAWINGS

Other objects, features and advantages of the present invention will become more apparent from the following detailed description when read in conjunction with the accompanying drawings, in which:

FIG. 22 is a timing chart of detection signals output from PDs for beam position detection shown in FIG. 18 and write-related timing;

FIG. 23 is a timing chart showing another timing;

DETAILED DESCRIPTION OF THE PREFERRED EMBODIMENTS

A description will now be given, with reference to the accompanying drawings, of embodiments of the present invention.

Figure 1:
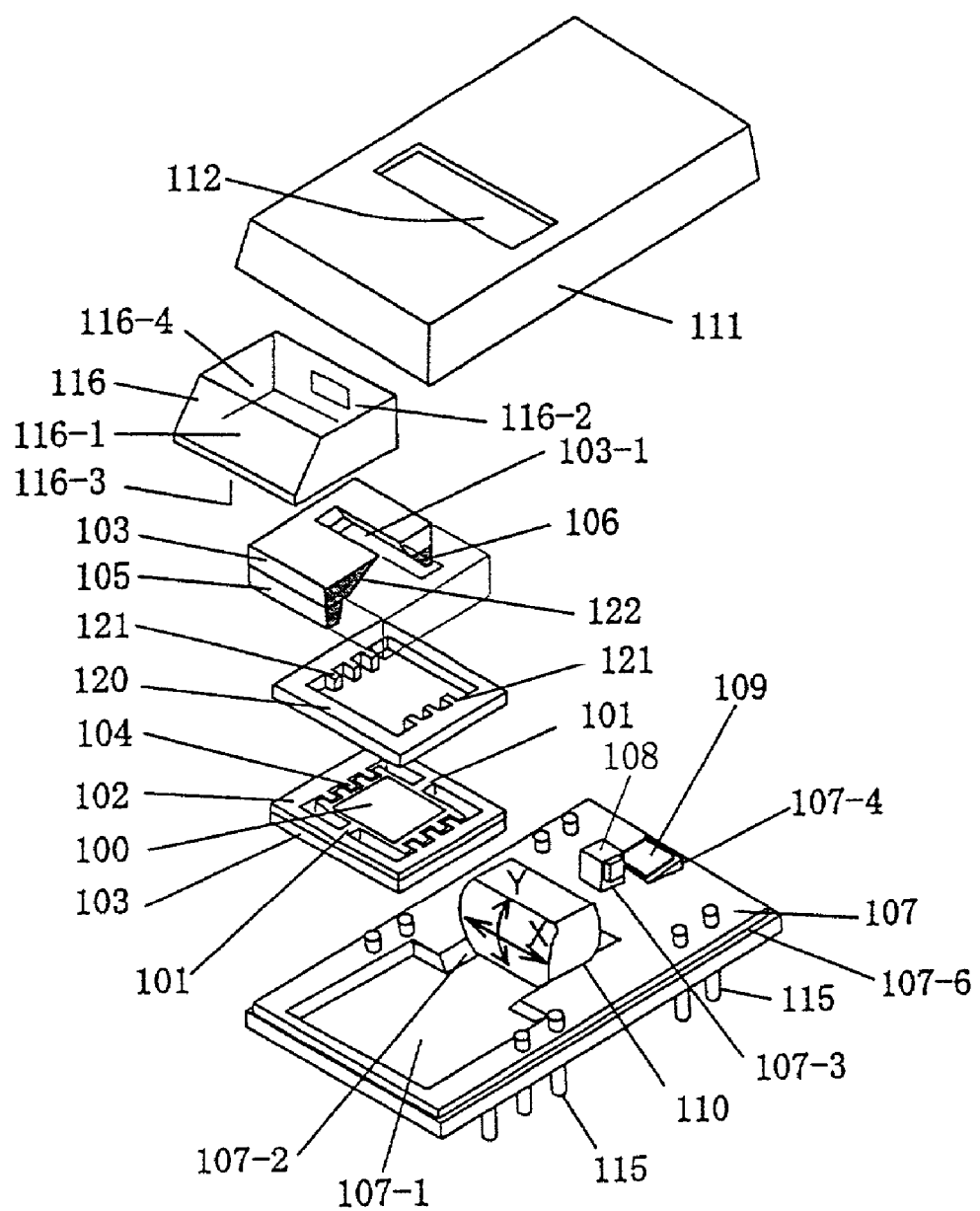
FIG. 1 is an exploded perspective view of an optical scanning module provided in an optical scanning device according to a first embodiment of the present invention.

FIG. 1 is an exploded perspective view of an optical scanning module provided in an optical scanning device according to a first embodiment of the present invention. In FIG. 1, a mirror substrate 102 is formed by first forming a square hole in the bottom of a silicon substrate by etching so that a frame part of a given thickness and a top plate part of a given thickness are formed in the silicon substrate and then forming through holes in the top plate part so that a movable mirror 100 and torsion bars 101 turnably supporting the movable mirror 100 are formed therein, surrounded by the through holes.

The movable mirror 100 has a mirror surface formed of a vapor-deposited metal film in its center part. Side edge parts of the movable mirror 100 extending along the torsion bars 101 are formed of convex and concave parts arranged like comb teeth, and form movable electrodes 104. The movable mirror 100 oscillates in a hollow part or the square hole formed in the bottom of the mirror substrate 102. An electrode substrate 120 has a frame-like shape with a through hole formed in the center part thereof. The electrode substrate 120 has fixed electrodes 121 formed on a pair of opposing sides thereof. The fixed electrodes 121 are formed of convex and concave parts arranged like comb teeth on the opposing sides of the electrode substrate 120. The convex and concave parts of the fixed electrodes 121 are formed so as to be placed over the concave and convex parts of the movable electrodes 104, respectively, when the electrode substrate 120 is joined to the upper surface of the mirror substrate 102 so that the fixed electrodes 121 opposes the movable electrodes 104 and the movable mirror 100 is allowed to oscillate in the through hole formed in the center of the electrode substrate 120. The area of each of the opposing surfaces of the movable electrodes 104 and the fixed electrodes 121 is enlarged by forming the movable electrodes 104 and the fixed electrodes 121 of the convex and concave parts arranged like comb teeth so as to reduce a driving voltage for the movable mirror in this embodiment.

Figure 2:
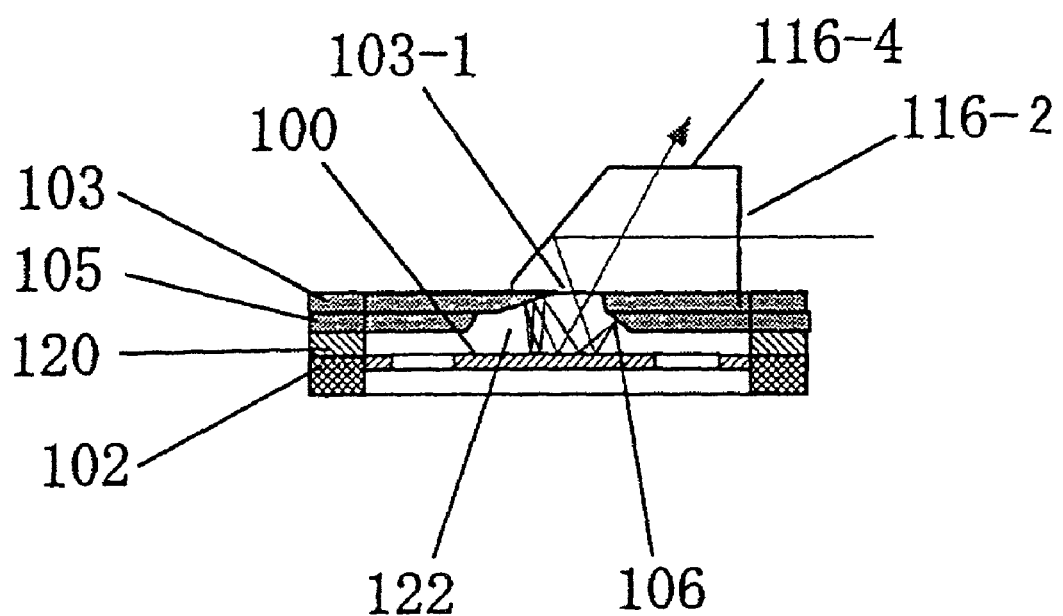
FIG. 2 is a sectional view of the optical scanning module of FIG. 1.

An opposing mirror substrate formed by bonding first and second silicon substrates 105 and 103 together is joined to the upper surface of the electrode substrate 120. A wafer sliced off at an angle of inclination of approximately 9° to a crystal orientation of <110> is employed for the first substrate 105. A reflection surface 106 is formed of a vapor-deposited metal film on a slope formed on the first substrate 105 by etching, which slope is inclined at 26.3° to the surface of the first substrate 105. A wafer sliced off at an angle of inclination of approximately 9° to a crystal orientation of <111> is employed for the second substrate 103. A reflection surface 122 is formed of a vapor-deposited metal film on a slope formed on the second substrate 103 by etching, which slope is inclined at 9° to the surface of the second substrate 103. As shown in FIG. 2, which is a sectional view of the optical scanning module of FIG. 1, the second substrate 103 has an opening part 103-1 formed therein next to the reflection surface 122 so that a light beam travels through the opening part 103-1. The reflection surfaces 106 and 122 are provided in a pair across the opening part 103-1 from each other at an angle of 144.7° to each other.

A prism 116, which includes an incidence surface 116-2 through which the light beam is made incident on the prism 116, an emission surface 116-4 through which the light beam is emitted from the prism 116, a reflection surface 116-1 reflecting the light beam to the movable mirror 100, and a joint surface 116-1, is joined to the upper surface of the second substrate 103. As shown in FIG. 2, the light beam made incident on the movable mirror 100 at a given angle (for instance, at 20°) through the opening part 103-1 is reflected from the reflection surface 106 to be reflected again from the movable mirror 100. Then, the light beam is reflected a plurality of times between the movable mirror 100 and the reflection mirror 122 with its reflection point moving in a secondary or sub scanning direction. Thereafter, the light beam is made incident again on the prism 116 through the opening part 103-1 to be emitted from the emission surface 116-4. Thus, by repeating reflection a plurality of times, a greater scanning angle can be obtained with a smaller swing angle of the movable mirror 100. A scanning angle θ is given by $$\theta = 2N\alpha$$

where N is the number of reflections on the movable mirror 100 (N=5, for instance) and α is a swing angle.

When voltage is applied to one of the fixed electrodes 121, an electrostatic attraction is generated between the one of the fixed electrodes 121 and the opposing movable electrode 104 of the movable mirror 100. As a result, the torsion bars 101 are twisted so that the movable mirror 100 is inclined from a horizontal state up to a state where the electrostatic attraction and the twisting force of the torsion bars 101 are balanced. When the application of the voltage is stopped, the movable mirror 100 is moved back in the horizontal state by the restoration force of the torsion bars 101. When the voltage is applied to the other fixed electrode 121, the movable mirror 100 is inclined in the other direction. Thus, the movable mirror 100 oscillates back and forth or in the opposite turning directions by periodically switching voltage applications to the fixed electrodes 121 from one to the other.

When a frequency for applying the voltage approaches the natural frequency of the movable mirror 100, the movable mirror 100 enters a state of resonance so that the oscillation of the movable mirror 100 is amplified to be greater than a displacement caused by the electrostatic attraction, causing the swing angle α to be remarkably greater. In this embodiment, the natural frequency of the movable mirror 100 is set to match a recording rate. That is, the thickness of the movable mirror 100 and the thickness and the length of the torsion bars 101 are determined to match the recording rate. Generally, the maximum swing angle θ0 is given by the following expression:

$$\theta 0 = T/K (K = G \cdot I/L)$$

where G is the modulus of elasticity, I is the geometrical moment of inertia, L is the length, K is the spring constant determined by the length L, and T is the torque given by the electrostatic attraction of the torsion bars 101 supporting the movable mirror 100.

Further, the resonant frequency fd of the movable mirror 100 is given by the following expression:

$$fd = (K/J)^{1/2}$$

where J is the moment of inertia.

By using resonance, the movable mirror 100 is allowed to oscillate with a minute applied voltage and reduced heat generation. However, as the recording rate becomes higher, the stiffness of the torsion bars 101 increases, so that the swing angle α is prevented from being obtained. Therefore, the scanning angle is enlarged by providing the opposing mirrors of the reflection surfaces 106 and 122 so that a necessary and sufficient scanning angle may be obtained irrespective of the recording rate.

A support frame 107 is formed of sintered metal, and lead terminals 115 are inserted thereinto via an insulating material. The support frame 107 has a joint surface 107-1 on which the mirror substrate 102 is mounted, a groove 107-2 which a coupling lens 110 is positioned in and bonded to, a mounting surface 107-3 on which an LD (laser diode) chip 108 is mounted, and a mounting surface 107-4 on which a monitor PD (photo diode) chip 109 is mounted. The LD chip 108 is formed to extend in a direction perpendicular to the joint surface 107-1. The monitor PD chip receives a light emitted from the backside of an LD of the LD chip 108. The groove 107-2 has its opposing sidewalls inclined with respect to the joint surface 107-1 as shown in FIG. 1.

The coupling lens 110 is shaped like a cylinder having longitudinal parts cut off so that two opposing planes (or cut surfaces) are formed on its longitudinal surface. The coupling lens 110 includes a first surface that is an axially symmetrical aspheric surface and a second surface that is a cylinder surface having a curvature in the secondary scanning direction indicated by arrow Y in FIG. 1. The groove 107-2 has its width and the angle or inclination of each of its sidewalls determined so that the optical axis of the coupling lens 110 meets the light emission point of the LD chip 108 when the outer round surface (longitudinal surface) of the coupling lens 110 contacts the groove 107-2. The coupling lens 110 is adjusted in the direction of the optical axis so that a divergent bundle of rays emitted from the LD chip 108 becomes a bundle of parallel rays in a primary or main scanning direction indicated by arrow X in FIG. 1 and a convergent bundle of rays that converges on the surface of the movable mirror 100 in the secondary scanning direction. Thereafter, the coupling lens 110 is bonded and fixed to the groove 107-2. The cut surfaces are formed parallel to the generating line of the cylinder surface, and the coupling lens 110 is positioned centered on the optical axis so that the generating line is horizontal with the support frame 107.

A film serving as an aperture mask for shaping the light beam traveling through the coupling lens 110 so that the light beam has a given diameter is formed on the incidence surface 116-2 of the prism 116. The light beam traveling through the prism 116 and reflected from the movable mirror 100 for scanning is emitted upward through the emission surface 116-4.

A cover 111 is formed of a sheet metal to have a cap-like shape. The cover 111 has an opening through which the light beam is emitted. A glass plate 112 is joined to the opening from the inside of the cover 111. The cover 111 is fitted to a step part 107-6 formed on the periphery of the support frame 107 so as to protect the LD chip 108 and the mirror substrate 102 in an airtight condition. The LD chip 108, the monitor PD chip 109, and the fixed electrodes 121 are connected to ends of the corresponding lead terminals 115 by wire bonding, the ends protruding upward from the support frame 107.

Figure 3:
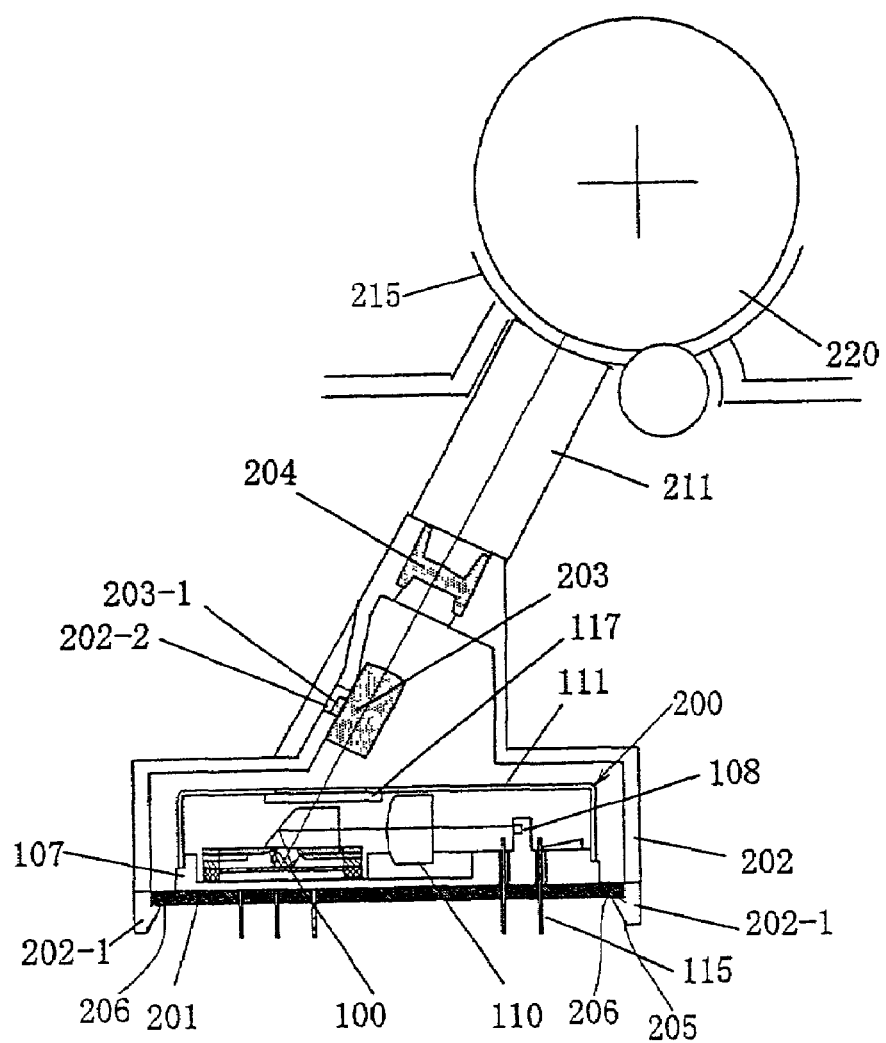
FIG. 3 is a sectional view of an optical scanning device according to a second embodiment of the present invention.
Figure 4A:
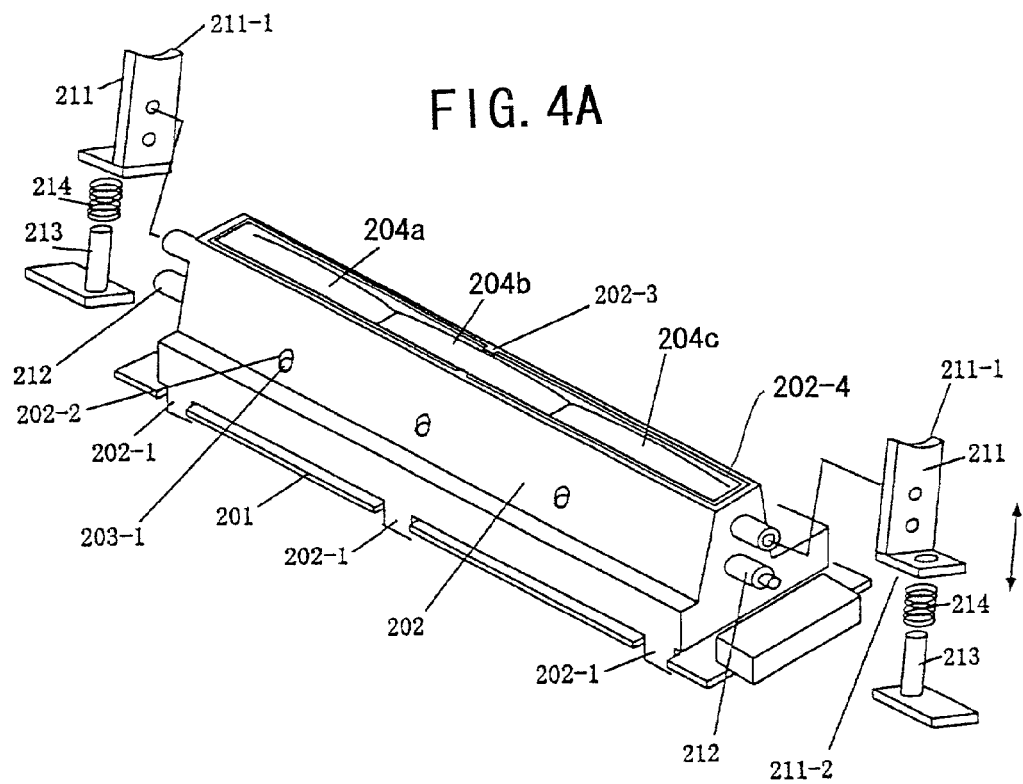
FIGS. 4A and 4B are perspective views of the optical scanning device of FIG. 3.
Figure 4B:
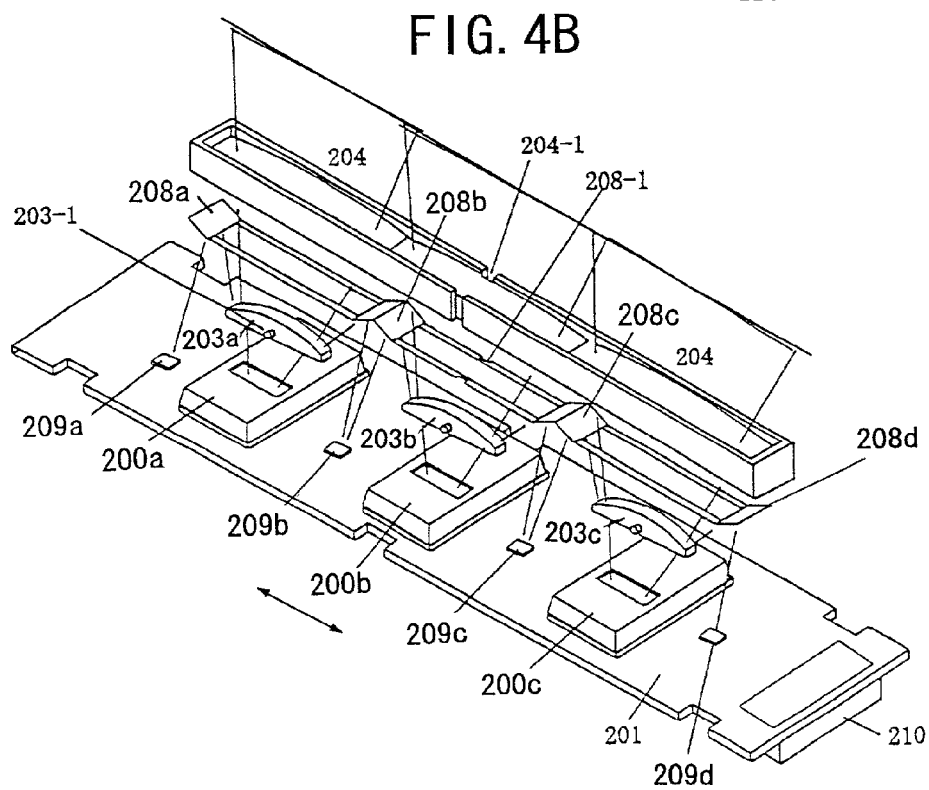

FIG. 3 is a sectional view of an optical scanning device according to a second embodiment of the present invention. FIGS. 4A and 4B are perspective views of the optical scanning device of FIG. 3. First through third optical scanning modules 200a through 200c according to the above-described configuration are arranged in the primary scanning direction on a printed board 201 on which electronic components forming the driving circuits of the LDs and the movable mirrors 100 of the optical scanning modules 200a through 200c are mounted. In mounting the optical scanning modules 200a through 200c on the printed board 201, each of the support frames 107 has its bottom surface contacting the printed board 201 with the lead terminals 115 protruding downward from its bottom surface being inserted into corresponding through holes formed in the printed board 201. Then, the optical scanning modules 200a through 200c are positioned on the printed board 201 with respect to each other within the clearances of the through holes, and are temporarily fixed to the printed board 201. Thereafter, like the other electronic components, the optical scanning modules 200a through 200c are soldered and fixed to the printed board 201 at one time.

The printed board 201 supporting the optical scanning modules 200a through 200c contacts a housing 202 so as to close a lower opening thereof, and is held between pairs of snap claws 202-1 formed integrally with the housing 202. The printed board 201 has indentations that engage the widths of the snap claws 202-1 so that the printed board 201 is positioned in the primary scanning direction. Further, hook-like lock parts 206 formed on the snap claws 202-1 engage the edges of the printed board 201 so that the printed board 201 is positioned in the secondary scanning direction. The lock parts 206 are bent to be disengaged from the printed board 201 so that projections 205 press down the upper end of the printed board 201. Thereby, the printed board 201 is easily separated from the housing 202.

The housing has an opening part 202-4 through which light beams are emitted. Formed inside the housing 202 are a positioning surface on which first through third scanning lenses 203a through 203c are arranged and fixed in the primary scanning direction, a positioning part holding first through third scanning lenses 204a through 204c, and a holding part holding first through fourth synchronization mirrors 208a through 208d. The scanning lenses 203a through 203c and 204a through 204c and the synchronization mirrors 208a through 208d form an imaging part. In this embodiment, the first through third scanning lenses 204a through 204c for the optical scanning modules 200a through 200c are formed integrally with each other of resin, and the first through fourth synchronization mirrors 208a through 208d are formed of a high-luminance aluminum plate and connected to each other. The first through third scanning lenses 204a through 204c and the first through fourth synchronization mirrors 208a through 208d are fitted into the opening part 202-4 of the housing 202 from the outside thereof so as to be attached to the bottom side. Projections 202-3 are formed in the center part of the opening part 202-4 to engage concave parts 204-1 formed in the center part of the integrally formed first through third scanning lenses 204a through 204c and concave parts 208-1 formed in the center part of the connected first through fourth synchronization mirrors 208a through 208d. Thereby, the first through third scanning lenses 204a through 204c and the first through fourth synchronization mirrors 208a through 208d are positioned in the primary scanning direction. The first through third scanning lenses 204a through 204c and the first through fourth synchronization mirrors 208a through 208d are positioned in the secondary scanning direction by being pressed onto one end of the opening part 202-4.

Each of the scanning lenses 203a through 203c has a projection 203-1 for positioning formed on one longitudinal side thereof in the primary scanning direction. The projections 203-1 of the scanning lenses 203a through 203c are inserted into corresponding engagement holes 202-2 formed at equal intervals on the surface of the housing 202 so that the scanning lenses 203a through 203c are positioned with respect to each other in the primary scanning direction. At the same time, the scanning lenses 203a through 203c have their bottom surfaces in the secondary scanning direction contacting a bonding surface so as to be positioned in the secondary scanning direction. The bonding surface is provided so that the heights of the scanning lenses 203a through 203c are on a level with one another.

PIN photo diodes are employed as first through fourth synchronization detection sensors 209a through 209d. The second and third synchronization detection sensor 209b and 209c are mounted in positions between the optical scanning modules 200a and 200b and 200b and 200c on the printed board 201 so as to be shared by the optical scanning modules 200a and 200b and 200b and 200c, respectively. The first and fourth synchronization detection sensors 209a and 209d are mounted in positions between the first optical scanning module 200a and one end of the printed board 201 and the third optical scanning module 200c and the other end of the printed board 201, respectively, on the printed board 201. Thus, the light beam can be detected on the scanning-start side and the scanning-end side of each of the optical scanning modules 200a through 200c. The first through fourth synchronization mirrors 208a through 208d are provided in positions corresponding to the synchronization detection sensors 209a through 209d. Each of the synchronization mirrors 208b and 208c has two reflection surfaces joined at a certain angle so as to reflect the light beam from the scanning-end side of one of the adjacent optical scanning modules 200a and 200b (or 200b and 200c) and the light beam from the scanning-start side of the other of the adjacent optical scanning modules 200a and 200b (or 200b and 200c) toward the common synchronization detection sensor 209b (or 209c). The synchronization mirrors 208a and 208d each have a single reflection surface so as to reflect the light beams from the scanning modules 200a and 200d toward the synchronization detection sensors 209a and 209d, respectively.

Power is supplied to and data signals are transmitted to and from the optical scanning modules 200a through 200c all through a connector 210. L-shaped positioning members 211 each having a contact surface 211-1 that fits a cylindrical surface 215 provided concentrically with a later-described photosensitive body drum 220 on a cartridge holding the photosensitive body drum 220 are attached to both primary-directional sides of the housing 202. Each of the positioning members 211 is screwed to projection parts 212 of the housing 202, and then has an attachment surface 211-2 thereof attached via a spring 214 to a pin 213 provided to the frame of the main body of the optical scanning device. Therefore, the positioning members 211 are constantly pressed onto the cartridge, so that the optical scanning modules 200a through 200c can be positioned positively with respect to the photosensitive body drum 220 at one time.

Figure 5:
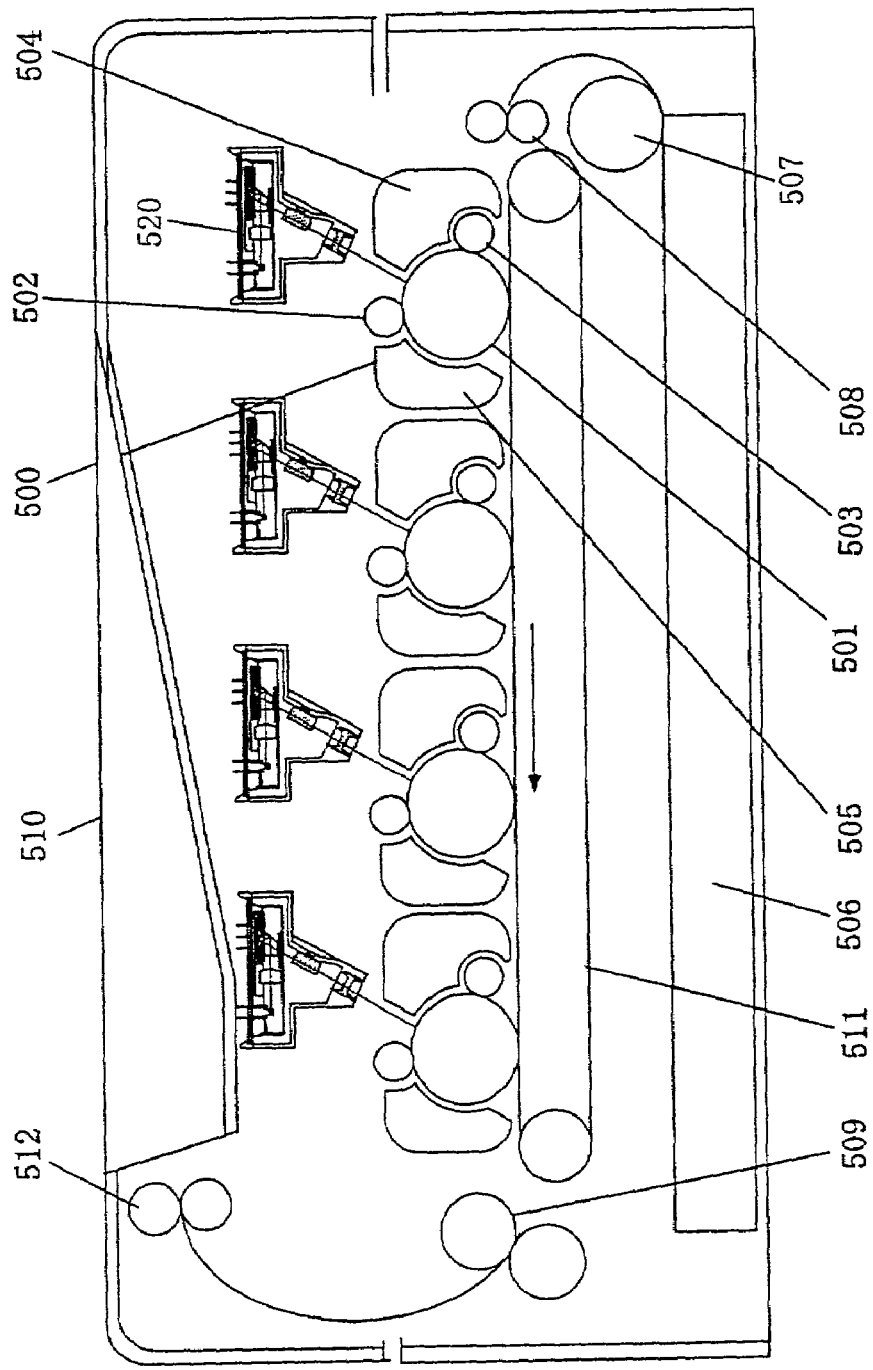
FIG. 5 is a sectional view of a color laser printer according to a third embodiment of the present invention to which printer optical scanning devices of the present invention are applied.

FIG. 5 is a sectional view of a color laser printer according to a third embodiment of the present invention to which printer the optical scanning devices of the present invention are applied.

An optical scanning device 520 according to the above-described configuration and a process cartridge 500 are positioned for each of colors (yellow, magenta, cyan, and black) and provided in series in a paper-conveying direction indicated by arrow in FIG. 5 in the color laser printer. A paper sheet is supplied from a paper feed tray 506 by a paper feed roller 507, and fed in timing with printing by a registration roller 508. Then, the paper sheet is conveyed in the paper-conveying direction on a conveyer belt 511. A toner image of each color formed by an electrostatic attraction is transferred to the paper sheet when the paper sheet passes each photosensitive body drum (an image holding body) 501 so that the color images are successively superimposed one over the other to be fixed on the paper sheet by a fixing roller 509. Then, the paper sheet is ejected onto a paper ejection tray 510 by a paper ejection roller 512. The process cartridges 500 are different only in toner color, and are equal in configuration. Provided around each photosensitive body drum 501 is a charging roller 502 that charges the photosensitive body drum 501 with a high voltage, a developing roller 503 that forms a visible image by attaching charged toner to an electrostatic latent image recorded by the optical scanning device 520, a toner hopper 504 storing the toner, and a cleaning case 505 scraping and storing residual toner on the photosensitive body drum 501 after the toner image is transferred to the paper sheet.

Each optical scanning device 520 forms one line by connecting the scanning lines of the optical scanning modules 200a through 200c, and performs printing by dividing all dots whose total number is L into three groups of dots 1 through L1, dots L1+1 through L2, and dots L2+1 through L and allocating the three groups of the dots to an image from its starting end. In this embodiment, the number of allocated dots (for instance, L1) to each group is different in each color so that the joints of the scanning lines of one color are prevented from being formed on the joints of the scanning of another color in the same one line.

Figure 6:
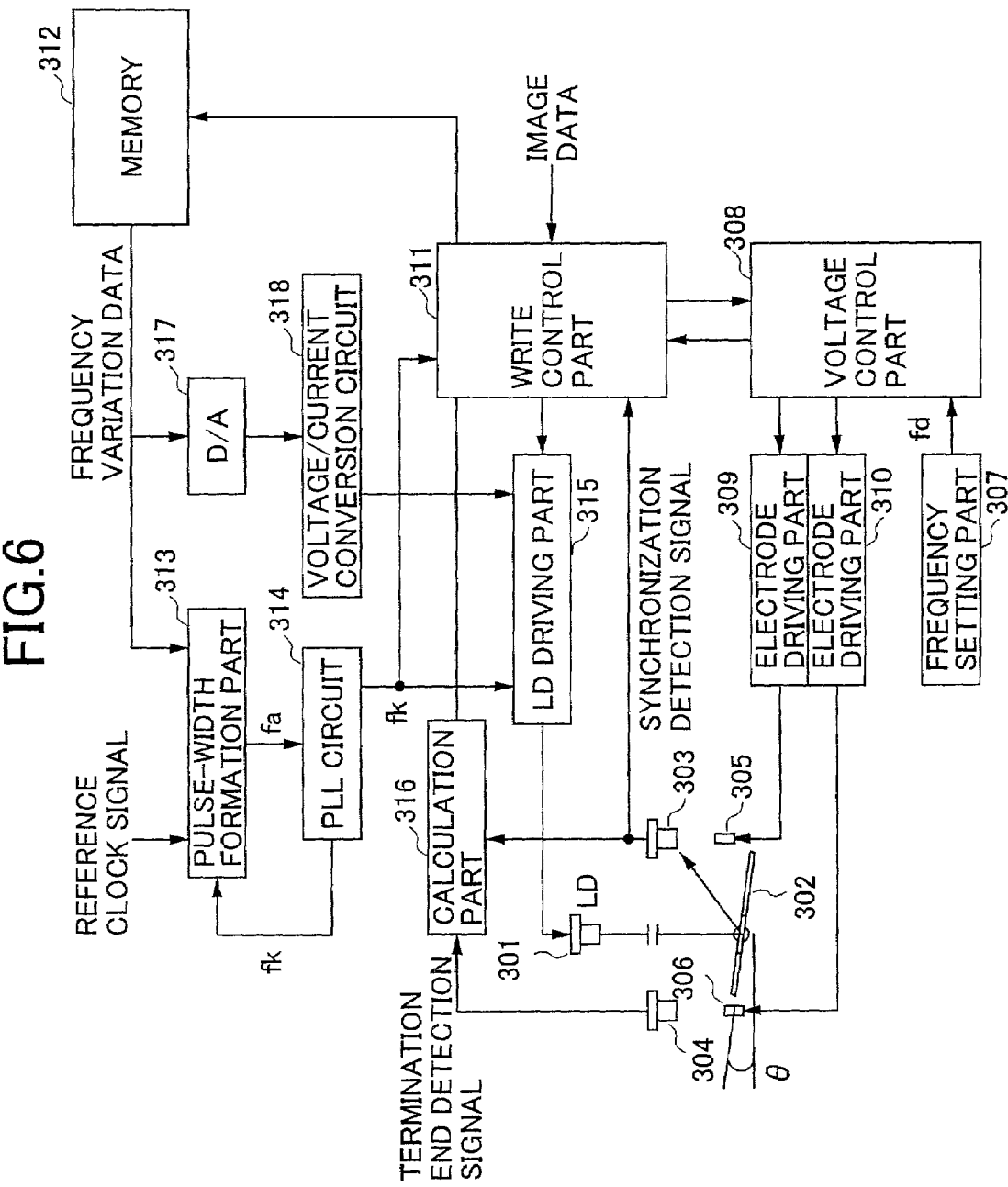
FIG. 6 is a block diagram showing a drive control circuit of an LD (semiconductor laser) and a movable mirror.

FIG. 6 is a block diagram showing a drive control circuit of the LD (semiconductor laser) and the movable mirror. In FIG. 6, the scanning frequency fd is varied in a frequency setting part 307 in accordance with the resonant frequency of a movable mirror 302. Pulse-like voltages are applied from a voltage control part 308 to fixed electrodes 305 and 306 via electrode driving parts 309 and 310 with a phase difference of a half period. Thereby, the movable mirror 302 oscillates by resonance.

In this embodiment, while the swing angle of the movable mirror 302 changes from θ0 to −θ0 with the movable mirror 302 moving in a forward direction, image recording is performed during a period between θs and −θs (0<θs<θ0). While the swing angle of the movable mirror 302 changes from −θ0 to θ0 with the movable mirror 302 moving in a reverse direction, image recording is suspended. In other words, image recording is performed every other cycle of the scanning frequency fd. Here, θ0 is set to 5°, and θs/θ0 is set to 0.7. An LD 301 is turned on when voltage application to the fixed electrode 305 is stopped. A synchronization detection sensor 303 detects a light beam to generate a synchronization detection signal. Recording start timing is determined based on the synchronization detection signal. During a wait for image recording, lowered or no voltage is applied to any of the fixed electrodes 305 and 306 to reduce power consumption, thereby reducing the amplitude or the swing angle (and noise as well) of the movable mirror 302. During this period, no synchronization detection signal is generated.

When a power is turned on or image recording is started, the voltage applied from the voltage control part 308 to each of the fixed electrodes 305 and 306 is gradually increased to increase an electrostatic attraction gradually until the synchronization detection signal is obtained from the synchronization detection sensor 303. Thereby, the amplitude of the movable mirror 302 is gradually increased. When the level of the synchronization detection signal reaches a given value, increasing the voltage applied to each of the fixed electrodes 305 and 306 is stopped. By gradually increasing the amplitude of the movable mirror 302, an excessive rotational force is prevented from being applied thereto, thus preventing the movable mirror 302 from being damaged.

Synchronization detection is performed when the swing angle is θ0 or close thereto. A termination end detection sensor 304 is provided to detect the light beam reflected from the movable mirror 302 when the swing angle thereof is −θ0 or close thereto. The termination end detection sensor 304 detects the light beam at the end of a scan and generates a termination end detection signal. A time difference between the termination end detection signal and the synchronization detection signal supplied from the synchronization detection sensor 303, that is, scanning time, is calculated in a calculation part 316. The voltage applied to the fixed electrode 305 is increased or decreased so that the time difference has a given value, thereby correcting a variation in the amplitude of the movable mirror 302 caused by a shift of the resonant frequency due to a change in ambient temperature. The scanning time may be detected only with the detection signal of the synchronization detection sensor 303 without providing the termination end detection sensor 304. Obviously, another optical detection sensor may be provided for detection of the scanning time.

Figure 7:
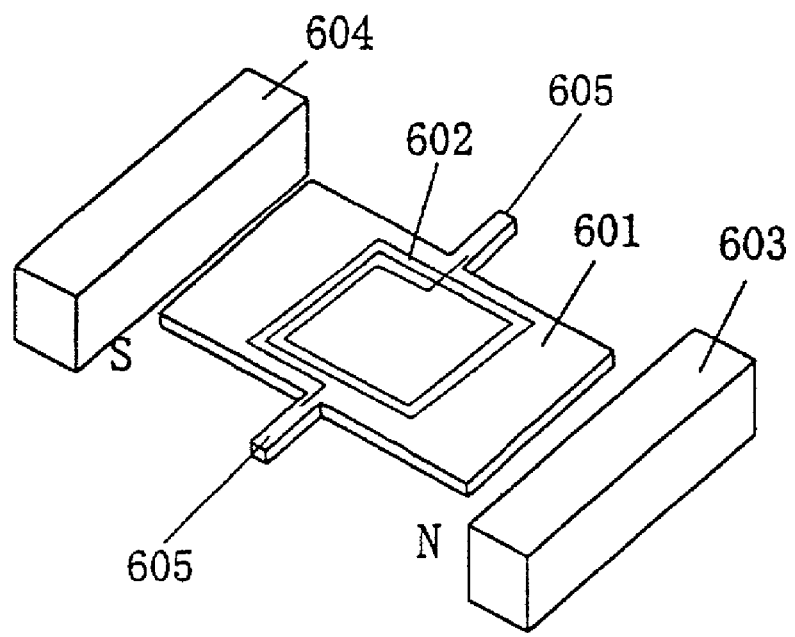
FIG. 7 is a diagram showing another scanning rate detection mechanism.

Detection of the scanning time is only acquisition of a substitute characteristic for detecting the amplitude (the maximum displacement) of the movable mirror 302. The amplitude may be detected with another characteristic. For instance, FIG. 7 shows another scanning rate detection mechanism. A coil 602 is patterned on the bottom side of a movable mirror 601, and interconnection lines extend from torsion bars 605. Permanent magnets 603 and 604 are provided on both sides of the torsion bars 605 outside the movable mirror 601 so that the north poles of the permanent magnets 603 and 604 oppose the south poles of the permanent magnets 604 and 603, respectively. According to this configuration, an electric current flows through the coil 602 when the movable mirror 601 is inclined, and this electric current is detected.

Referring back to FIG. 6, after these settings are completed, a write control part 311 performs sequence control so that the LD 301 is allowed to light in a recording region. At the same time, when the detection signals are not obtained from the synchronization detection sensor 303 and the termination end detection sensor 304 or the scanning time falls short of the given value although the applied voltage exceeds a predetermined limit value, the write control part 311 outputs an error signal so as to stop applying the voltage to each of the fixed electrodes 305 and 306, thereby preventing more emission of the light beam to the outside of the optical scanning device 520 than is required. In this embodiment, since the optical scanning device 520 includes the three optical scanning modules 200a through 200c, a printing operation is started only after it is confirmed in each of the optical scanning modules 200a through 200c that the detection signals are obtained from the synchronization detection sensor 303 and the termination end detection sensor 304 and the scanning time reaches the given value before the applied voltage exceeds the predetermined limit value.

Accordingly, since the light beam is emitted from the optical scanning module 520 only when the light beam is emitted from the LD 301 for scanning, a human body is prevented from being exposed to the light beam even if the movable mirror 302 has a failure. Further, an excessive rotational force is prevented from being applied to the movable mirror 302 in a failed state, thereby preventing heat generation. This prevents the burnout of peripheral circuits.

Figure 8:
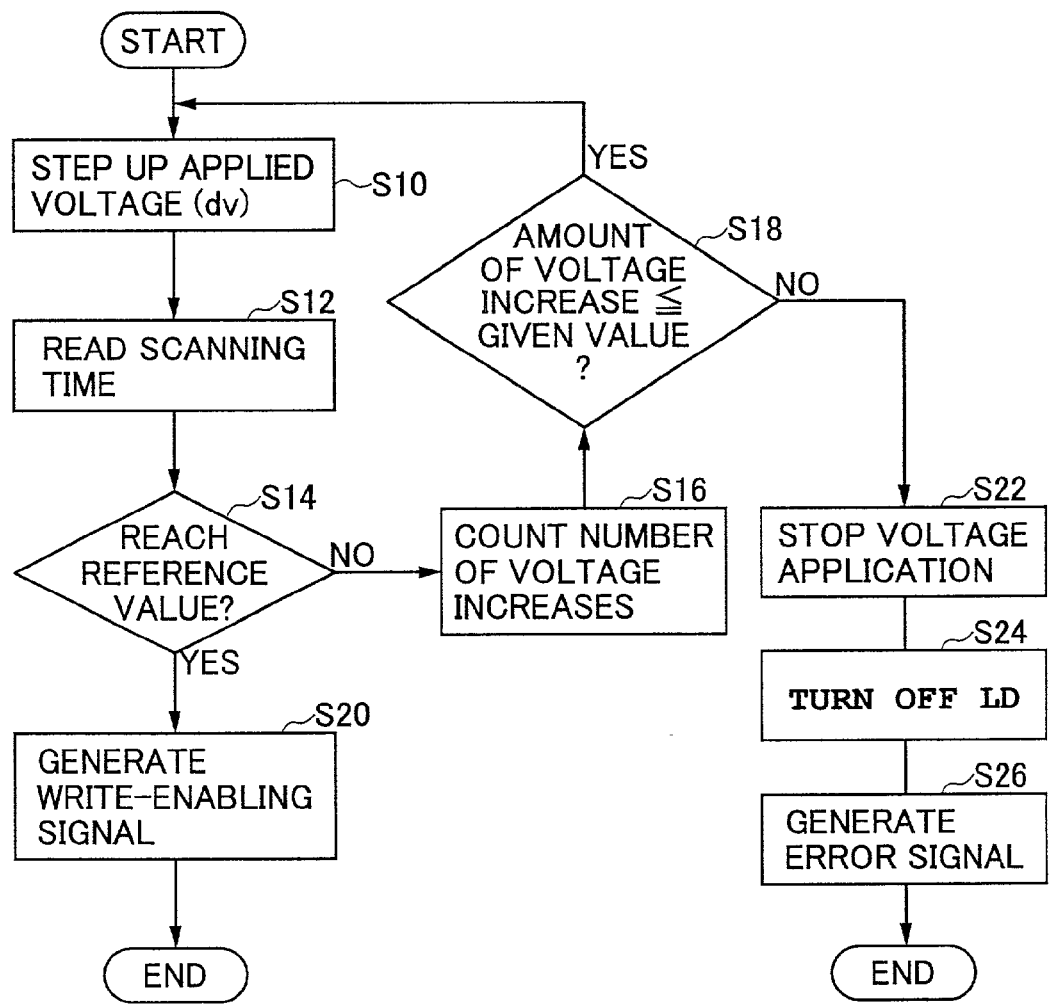
FIG. 8 is a flowchart of a movable mirror activation routine.

FIG. 8 is a flowchart of a movable mirror activation routine started by the voltage control part 308 and the write control part 311 when the movable mirror 302 is in a wait state or the power is turned on. In step S10 of FIG. 8, the voltage control part 308 increases the voltage applied to each of the fixed electrodes 305 and 306 by a minute voltage dV. In step S12, the scanning time calculated from the detection signals supplied from the synchronization detection sensor 303 and the termination end detection sensor 304 is read from the calculation part 316.

Next, in step S14, it is determined whether the scanning time reaches the given reference value. If the scanning time falls short of the given reference value, in step S16, the number of times the voltage is increased (the number of voltage increases) is counted. In step S18, it is determined whether the amount of increase in the voltage (the amount of voltage increase) is smaller than or equal to the given value corresponding to the limit value of the voltage. If it is determined in step S18 that the amount of voltage increase is smaller than or equal to the given value, step S10 is performed so that the voltage applied to each of the fixed electrodes 305 and 306 is increased by the minute voltage dV.

If it is determined in step S14 that the scanning time reaches the given reference value, in step S20, a write-enabling signal is generated so that the LD 301 is allowed to light in the recording region and a message is transmitted to the optical scanning modules 200 (for instance, 200a). Then, this operation ends.

If the amount of voltage increase exceeds the given value and the voltage applied to each of the fixed electrodes 305 and 306 has reached the limit value, in step S22, application of the voltage to each of the fixed electrodes 305 and 306 is stopped, and in step S24, the LD 301 is turned off. Thereafter, in step S26, the error signal is generated so that an error message is transmitted to each of the other optical scanning modules 200 (for instance, 200b and 200c). Then, this operation ends.

Thereby, a soft start is made so that the amplitude of the movable mirror 302 remains equal in accordance with environmental circumstances and no damage is caused by a sudden voltage application.

Figure 9:
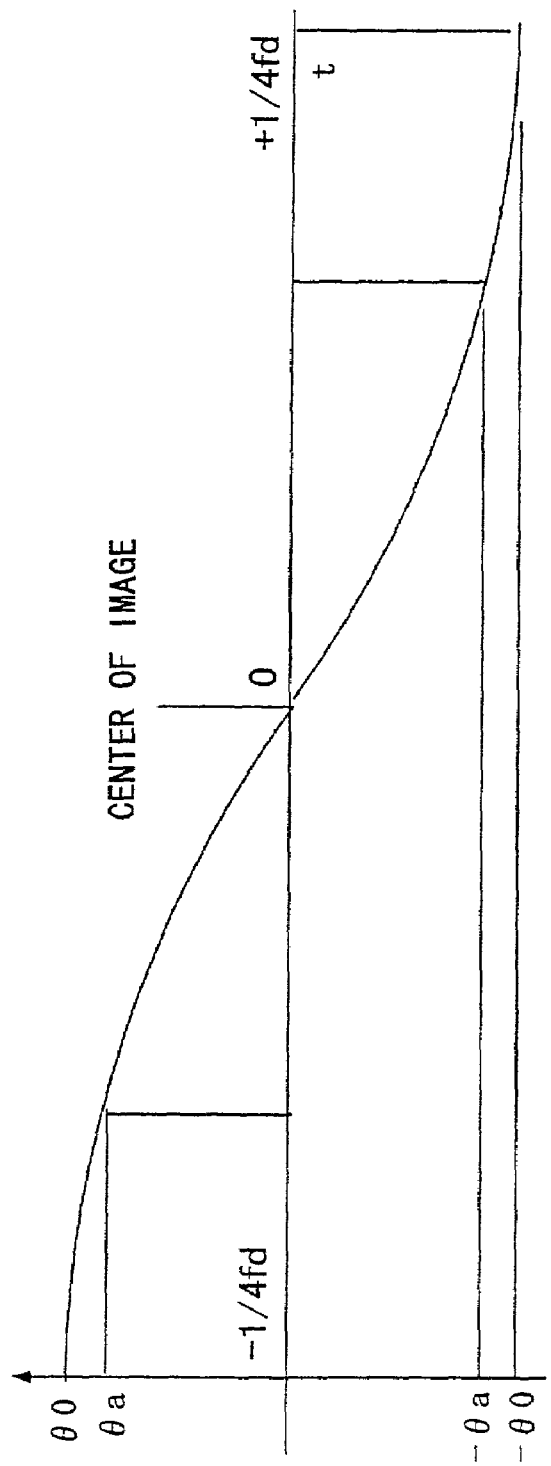
FIG. 9 is a diagram showing the way a swing angle $\theta$ of a movable mirror varies.

The movable mirror 302 oscillates by resonance so that the swing angle θ varies sinusoidally as shown in FIG. 9. That is, the scanning rate is high at the center of an image and low at the periphery thereof, which is represented by the following expression:

$$\theta=\theta 0 \cdot \sin 2\pi fd \cdot t (-1/4fd < t < 1/4fd)$$

where fd is the scanning frequency.

On the other hand, it is required to print dots in the primary scanning direction at equal intervals on the surface of the photosensitive body drum, which surface is to be scanned. Therefore, the scanning lenses 203 and 204 are required to have focusing characteristics that correct the direction of the light beam so that a scanning distance per unit scanning angle dH/dθ is proportional to $\sin^{-1}\theta/\theta 0$, that is, the scanning distance per unit scanning angle dH/dθ is smaller in the center of the image and becomes greater at an accelerating pace toward the periphery of the image. Further, as the swing angle of the movable mirror 302 becomes greater, the amplitude of the movable mirror 302 deviates from an ideal sinusoidal oscillation, and is prone to be affected by air resistance as the movable mirror 302 approaches an opposing surface.

Figure 10:
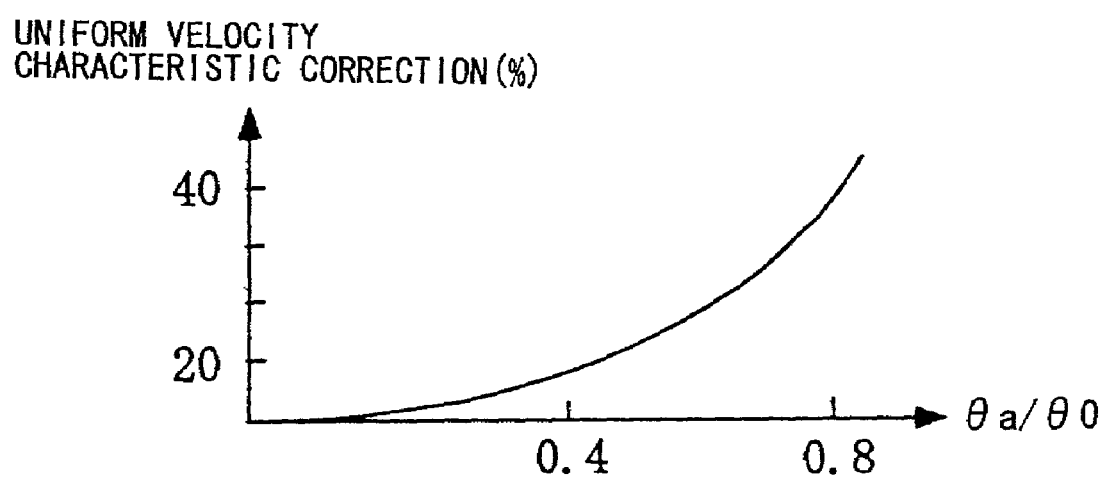
FIG. 10 is a diagram showing a relationship between $\theta a/\theta 0$ and a uniform velocity characteristic correction.

However, as a ratio of an effective swing angle θa to the maximum swing angle θ0 becomes higher, a correction should be increased considerably against deceleration of the scanning rate dH/dt in the periphery of the image. This requires a scanning lens to have a rate of change in its index of refraction for moving farther its focusing point increased over a part from the center to the periphery of the scanning lens. This causes the scanning lens to have a curved shape whose thickness varies greatly, although this makes it difficult to process the scanning lens itself into such a shape even by resin molding having a relatively high latitude. Further, a beam spot is caused to become greater in diameter in the periphery of the image so as to vary greatly during one scan. FIG. 10 shows a relationship between θa/θ0 and a uniform velocity characteristic correction.

Therefore, in this embodiment, correction in the scanning lenses 203 and 204 is limited to a proper amount, while correction is also provided by varying the print position (phase) of each dot and the pulse width of the frequency of a pixel clock signal fk (a pixel frequency) by varying the pixel frequency step by step in the primary scanning direction. The pixel frequency is the modulation frequency of the LD 301. According to this, by considering dH/dθ as an amount proportional to θ, the scanning lenses 203 and 204 may be so-called f·θ lenses, for instance, thereby performing correction. Of a required correction, a part made by the scanning lenses 203 and 204 and a part made by the pixel clock signal fk can be set to any ratio.

Figure 11:
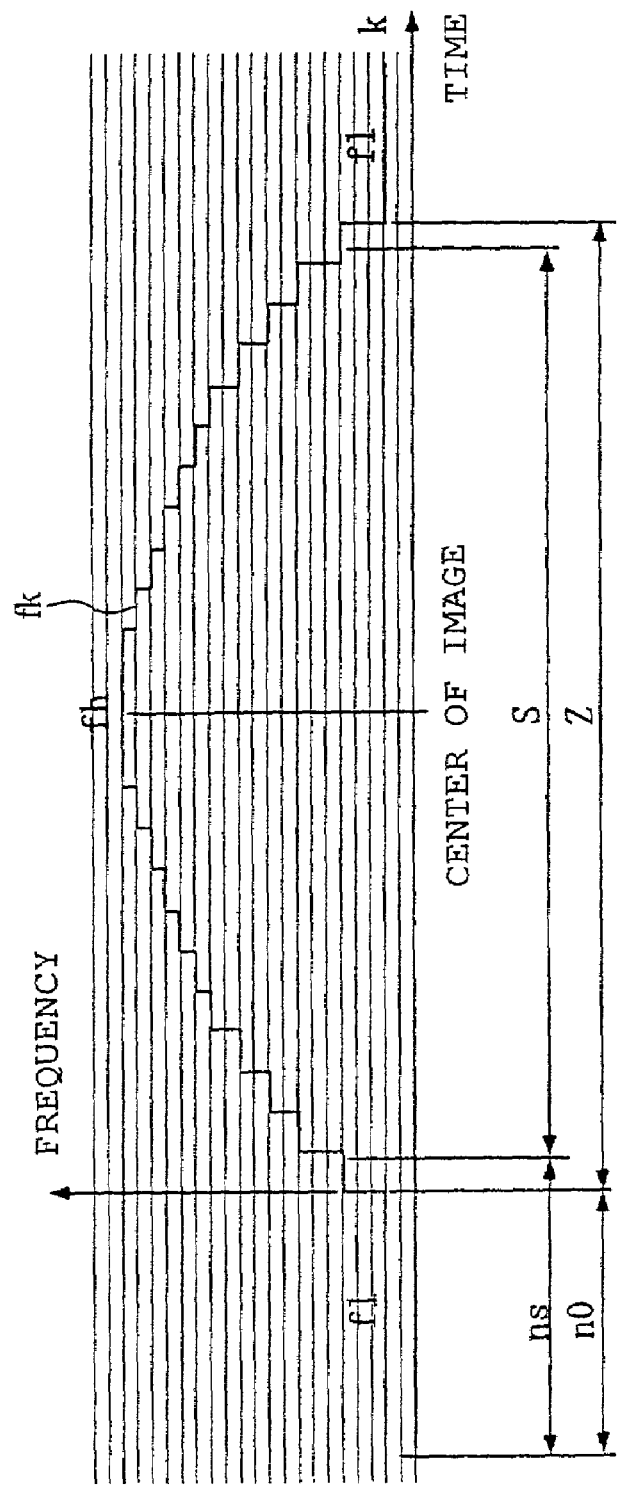
FIG. 11 is a diagram showing the way a pixel frequency varies.
Figures 12A, 12B:
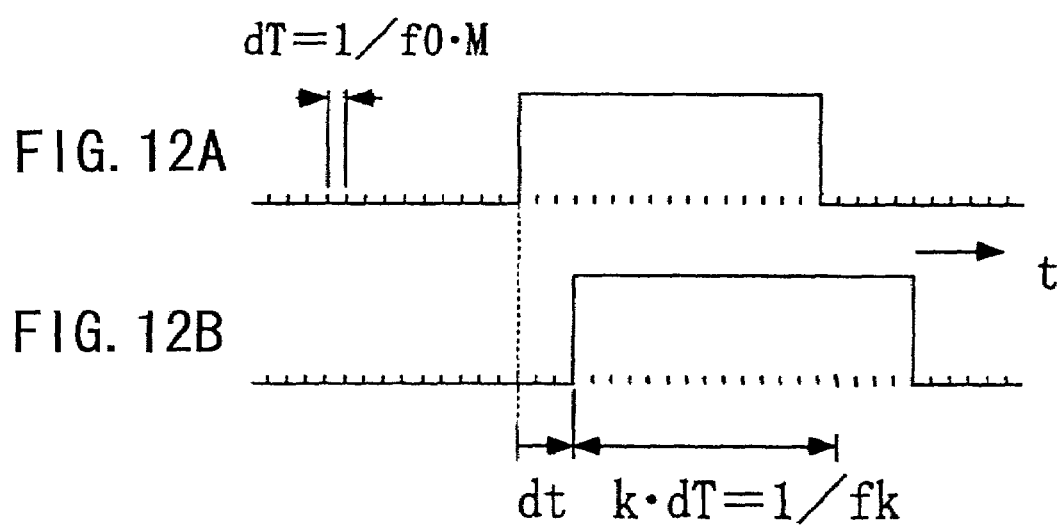
FIGS. 12A and 12B are diagrams showing waveforms of a pixel clock signal in a center of an image and in a periphery of the image, respectively.

By successively reading out frequency variation data pre-stored in a memory 312 shown in FIG. 6 by using the synchronization detection signal as a trigger under the control of the write control part 311, the pixel signal is varied so that the pixel frequency monotonously increases from a low frequency value fl to a high frequency value fh as a scanning point moves from the periphery of the image toward the center thereof and decreases from the high frequency value fh to the low frequency value fl as the scanning point moves from the center of the image toward the periphery thereof. FIG. 11 shows the way the pixel frequency varies. Thereby, the pixel clock signal fk has a longer pulse width in the center of the image as shown in FIG. 12A and a shorter pulse width in the periphery of the image as shown in FIG. 12B. The rise timing of the pulse of the pixel clock signal fk of FIG. 12A is delayed compared with that of the pulse of FIG. 12B. This is because the pulse width of the pixel clock signal fk gradually becomes longer as the scanning point moves from the center of the image toward the periphery thereof. Here, the pixel frequency is set to vary in symmetry with respect to the center of the image, but may vary asymmetrically since the frequency variation data is provided separately to each of the right and left regions of the image from the center thereof.

In a scan using the movable mirror 302, the scanning rate is higher at the center of the image and lower at the periphery of the image as shown in FIG. 9. In this embodiment, however, the high pixel frequency fh having a shorter pulse width at the center of the image is offset by the low pixel frequency fl having a longer pulse width in the periphery of the image so that the scanning rate is substantially the same in the entire region of the image from the center to the periphery thereof.

A description will be given, with reference to FIG. 6, a method of varying the pixel frequency. A pulse-width formation part 313, based on a frequency division ratio M given as the frequency variation data, counts clock cycles of a frequency-divided clock signal obtained by dividing a reference clock signal f0 by M, and forms a pulse of a width equivalent to k clock cycles (k=any integer). The frequency-divided clock signal has a frequency of f0/M. The pulse-width formation part 313 repeatedly performs this operation so as to output a PLL (phase-locked loop) reference signal fa having a frequency of k·f0/M that varies step by step in the primary scanning direction.

In a PLL circuit 314, the phases of the PLL reference signal fa and the pixel clock signal fk are compared. If there is a difference between the phases, the frequency of the pixel clock signal fk is changed and then supplied to the write control part 311, the pulse-width formation part 313, and an LD driving part 315. The write control part 311, supplied with the synchronization detection signal from the synchronization detection sensor 303, starts counting clock cycles of the PLL reference signal fa of the low frequency fl. Then, the write control part 311 generates and activates an address corresponding to the count value, and reads out the frequency variation data from the memory 312. As a result, the frequency variation data read out from the memory 312 varies from a count n0 as shown in FIG. 11. At a count ns, the write control part 311 reads out image data serially in synchronization with the pixel clock signal and supplies the image data to the LD driving part 315.

Here, the frequency of the pixel clock signal is given as k·(reference clock f0/frequency division ratio M). A region Z where the pixel clock signal varies is set to be wider than an image-recording region S by approximately 100 pixels on each end of the region S in the primary scanning direction. In accordance with this setting, the low frequency value fl is set to be lower than the value of the frequency of the pixel clock signal fk at each end of the image-recording region S. Thereby, the image-recording region S can be shifted by varying the count value ns for a period from the synchronization detection to the start of image recording.

Accordingly, the ends of the image recording regions S never go beyond the pixel frequency variation region Z. Therefore, high-quality image formation without image distortion can be performed. Further, in the case of forming an optical scanning device of a plurality of optical scanning modules, the scanning lines of each adjacent two of the optical scanning modules can be connected without causing image distortion at the connection point.

Further, by uniformly adding a correction number to the frequency division ratio M, the frequencies of the high and low frequency values fh and fl can be shifted with a frequency width fh-fl between the high and low frequency values fh and fl being maintained. Thereby, a variation in the resonant frequency of the movable mirror 302 and a change in an image recording width caused by an error in the shape of the scanning lens 203 or 204 can be corrected without any partial distortion by uniformly varying the cycle of each pixel (1/fk). At this point, an accumulated period of time of the pixels, that is, $T=\Sigma(k/fk)$ where k is the number of counted clock cycles or a clock count value, also varies. Therefore, the frequency variation data at the center of the image is set to coincide always with a time at which the movable mirror 302 is parallel to the mirror substrate 102 by changing the count value n0 for a period from the synchronization detection to the start of the change of the frequency of the pixel clock signal.

An energy E for exposing the photosensitive drum body 501 is expressed as P/fk where P is a beam intensity. Therefore, by supplying the frequency variation data based on which the pixel frequency varies to a D/A converter 317 and supplying the frequency variation data further to the LD driving part 315 via a voltage/current conversion circuit 318, a driving current for the LD 301 is varied so that the beam intensity P also varies step by step in the primary scanning direction. In this embodiment, the beam intensity P varies to be high at the center of the image and low at the periphery of the image.

Thus, a difference between light-emission periods at the time of varying the pixel frequency can be compensated for by the beam intensity P so that exposure energies per pixel can be equalized. Thereby, high-quality image formation without unevenness in density can be performed and image quality can be increased. Further, the number of optical scanning modules used in forming an optical scanning device can be decreased to lower power consumption.

The above-describe drive control of the LD 301 and the movable mirror 302 is performed separately in each of the optical scanning modules 200a through 200c forming the optical scanning device 520. With respect to driving of each movable mirror 302, the movable mirrors 302 are driven with the scanning frequencies fd having a phase difference of a half period in each adjacent two of the optical scanning modules 200a through 200c so that image recording starts in the optical scanning module 200 on the scanning downstream side (for instance, the optical scanning module 200b) with a delay of the half period of the scanning frequency fd from the start of image recording in the optical scanning module on the scanning upstream side (for instance, the optical scanning module 200a). Thereby, image recording starts in the downstream-side optical scanning module 200 at the same time that image recording ends in the upstream-side optical scanning module 200.

In the above-described embodiment, an electrostatic attraction is generated to drive the movable mirror 302. However, according to the above-described configuration, the movable mirror 302 may be a galvano-mirror driven by an electromagnetic force generated by applying voltage to a coil formed thereon so that lines of magnetic force extend in a direction crossing torsion bars, or the movable mirror 302 may be driven by a method that directly generates a displacement in a movable mirror by applying voltage to piezoelectric elements coupled to torsion bars.

Figure 13:
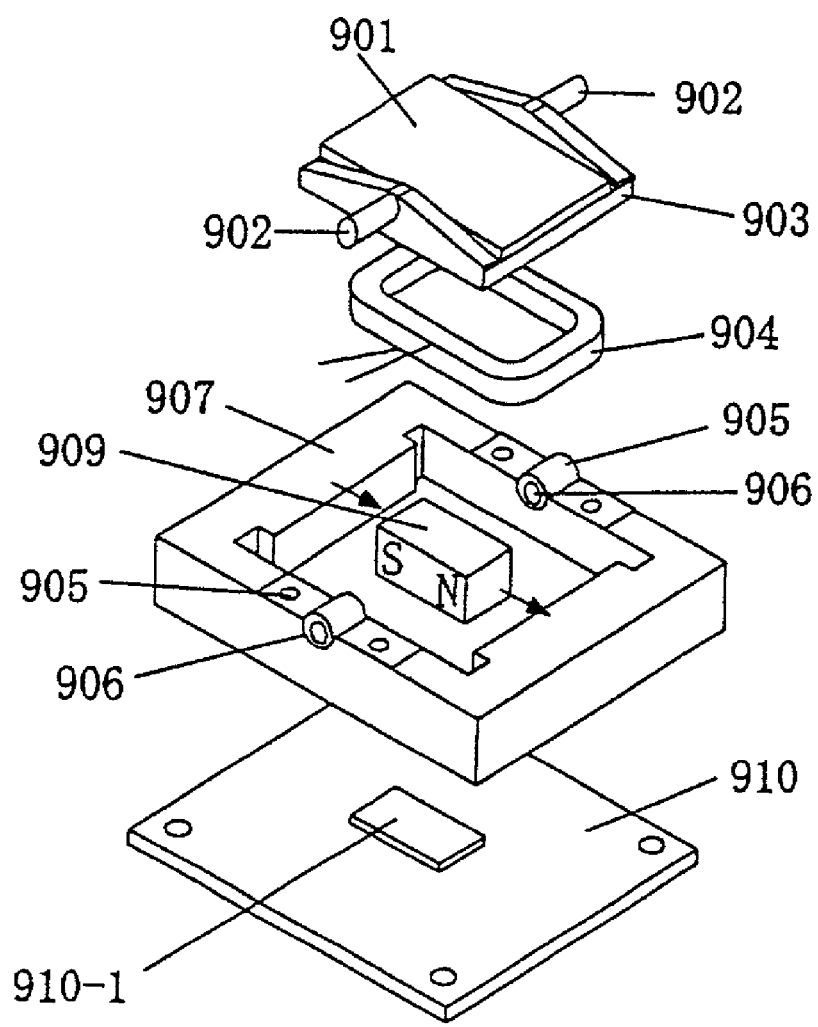
FIG. 13 is an exploded perspective view of a galvano-mirror according to the third embodiment.

FIG. 13 is an exploded perspective view of a galvano-mirror according to this embodiment. In FIG. 13, a holding member 903 has a rotary shaft 902 formed therein. A mirror 901 is joined to the top surface of the holding member 903, and a coil 904 is joined to the bottom surface thereof. Bearings 906 are held aligned on a yoke 907 by leaf springs 905 to turnably support the rotary shaft 902.

The yoke 907 is supported on a base member 910, and a magnet 909 is joined to a joint surface 910-1 of the base member 910 with its poles being properly oriented. Thereby, the magnet 909 and the yoke 907 are provided inside and outside the coil 904 without any contact therewith, respectively. With respect to a line of magnetic force indicated by arrow in FIG. 13, an electromagnetic force is generated by supplying an electric current I to one end of the coil 904, so that the mirror 901 is inclined in a given direction. By switching the polarities of the electric current, the mirror 901 oscillates in opposite turning directions.

In this embodiment, the optical scanning device 520 includes the three optical scanning modules 200a through 200c. However, the number of optical scanning modules is not limited to three, and the optical scanning device 520 may increase or decrease the number in accordance with the recording width of an imaging apparatus (the color laser printer).

Figure 14:
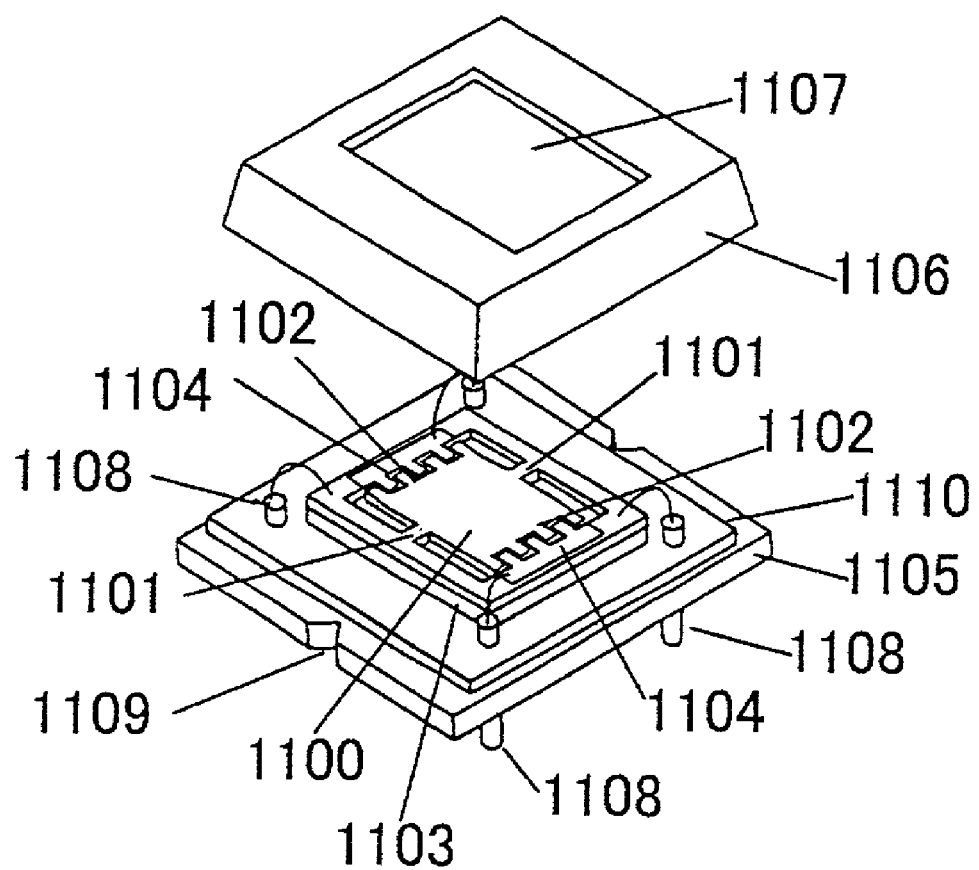
FIG. 14 is an exploded perspective view of an optical scanning module according to a fourth embodiment of the present invention.

FIG. 14 is an exploded perspective view of an optical scanning module according to a fourth embodiment of the present invention. In FIG. 14, a mirror substrate 1103 is composed of upper and lower silicon substrates, which are bonded to each other with an insulating layer formed therebetween. A movable mirror 1100 and torsion bars 1101 turnably supporting the movable mirror 1100 are formed by etching in the upper silicon substrate with through holes being formed therearound. A hole part is formed inside the lower silicon substrate by etching so that the lower silicon substrate has a frame-like shape. The hole part forms an oscillation space for the movable mirror 1100.

Side edge parts of the movable mirror 1100 extending along the torsion bars 1101 are formed of convex and concave parts arranged like comb teeth, and form movable electrodes 1102 with a metal film being vapor-deposited on the convex and concave parts. A metal film is vapor-deposited on the upper surface of the movable mirror 1100 so that a mirror surface is formed thereon. Further, on a frame part opposing the movable electrodes 1102, comb teeth-like convex and concave parts are formed, with a metal film being vapor-deposited thereon, as fixed electrodes 1104 opposing and engaging the movable electrodes 1102.

When voltage is applied to one of the fixed electrodes 1104, an electrostatic force is generated between the opposing one of the movable electrodes 1102 of the movable mirror 1100 to twist and turn the torsion bars 1101. By applying the voltage alternately to the two fixed electrodes 1104, the movable mirror 1100 oscillates in opposite turning directions. Here, when the frequency of the applied voltage approaches the resonant frequency of the movable mirror 1100, the movable mirror 1100 has its amplitude enlarged by resonance. Each of the movable electrodes 1102 and the fixed electrodes 1104 is shaped like comb teeth to have as long a peripheral length as possible for the purpose of enlarging its electrode surface. Thereby, a greater electrostatic torque can be obtained by a low voltage.

A support base body 1105 has a pedestal part 1110 formed integrally therewith of a sintered metal. A plurality of terminals 1108 are provided to penetrate the support base body 1105 and the pedestal part 1110 and be held therein with insulating materials being provided between the terminals 1108 and the support base body 1105 and the pedestal part 1110. The mirror substrate 1103 is joined to the pedestal part 1110, and the fixed electrodes 1104 are wire-bonded to the upper ends of the terminals 1108. The lower ends of the terminals 1108 are inserted into and soldered fixedly to through holes of a circuit board for electrical connection when the optical scanning module is mounted thereon.

A V-shaped notch 1109 is formed in each of opposing sides of the support base body 1105. At the time of production, the clamp mechanism of an adjustment device (not shown in the drawing) may hold the support base body 1105 by the notches 1109 and two-dimensionally move the support base body 1105. Thereby, the support base body 1105 may be moved and inclined in the secondary scanning direction to be positioned so that the scanning line of the optical scanning module is aligned with that of an adjacent optical scanning module. Thereafter, the support base body 1105 may be soldered to the circuit board.

A box-like cover 1106 having a window 1107 for letting through a light beam formed therein is attached to the outer edge of the pedestal part 1110 in an inert gas so that the inert gas is sealed inside the optical scanning module. By selecting a gas of low viscous drag as the inert gas or creating a depressurized condition inside the optical scanning module, the movable mirror 1100 may be turned with a lower load.

Figure 15:
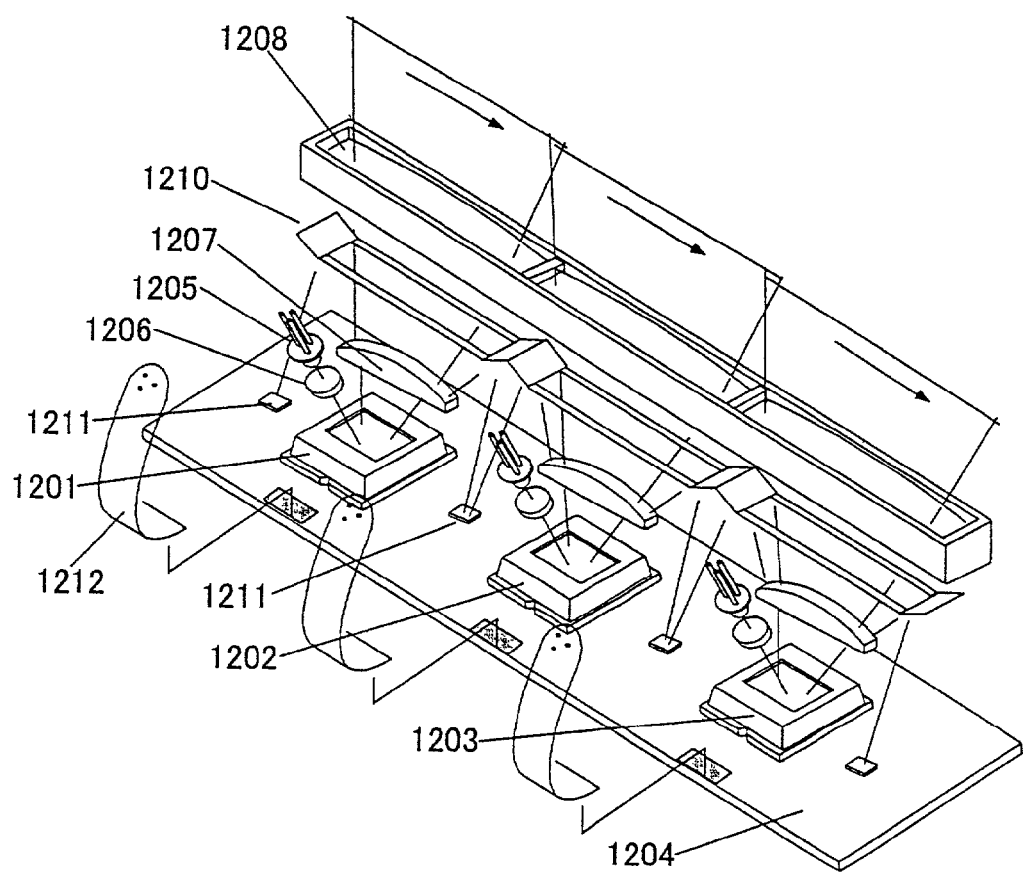
FIG. 15 is a perspective view of an optical scanning device to which the optical scanning modules according to the fourth embodiment are applied.

FIG. 15 is a perspective view of an optical scanning device to which the optical scanning modules according to the fourth embodiment are applied. In FIG. 15, optical scanning modules 1201 through 1203 are arranged at equal intervals on a circuit board 1204 with the same scanning direction. The driving circuits of a semiconductor laser 1205 and the movable mirror 1100 of each of the optical scanning modules 1201 through 1203 are formed on the circuit board 1204. Sensors 1211 are provided on both sides of each of the scanning modules 1201 through 1203 in the primary scanning direction. The sensor 1211 provided between the adjacent optical scanning modules 1201 and 1202 are shared thereby, and generates detection signals in a time series at the termination end of a scan by the optical scanning module 1201 and the starting end of a scan by the optical scanning module 1202. The sensor provided between the adjacent optical scanning modules 1202 and 1203 functions in the same way therebetween.

In each of the optical scanning modules 1201 through 1203, the semiconductor laser 1205, a coupling lens 1206, and first and second lenses 1207 and 1208 forming a scanning optical system are provided and fixed to a housing (not shown in the drawing) so as to have the same optical axis on a section in the secondary scanning direction including the rotary shaft of the movable mirror 1100. The adjacent second lenses 1208 are formed integrally with a box-like rib.

Each of the semiconductor lasers 1205 is a general-purpose device packaged with a light emission source and a monitoring photo diode, and has its lead terminal connected to the circuit board 1204 by a flexible cable 1212.

A light beam emitted from each semiconductor laser 1205 is caused by the coupling lens 1206 to be a bundle of substantially parallel rays in the primary scanning direction and a convergent bundle of rays that converges on the surface of the movable mirror 1100 in the secondary scanning direction. The coupling lens 1206 includes a first surface that is an axially symmetrical aspheric surface and a second surface that is a cylinder surface having a curvature in the secondary scanning direction. The light beams are inclined in the secondary scanning direction to the normal line of the movable mirror 1100 to be incident on the optical scanning modules 1201 through 1203. Then, the light beams are deflected to be emitted therefrom. The emitted light beams are focused on a scanned surface by the scanning optical systems so that image recording is performed.

Synchronization mirrors 1210 formed of a high-luminance aluminum plate are provided in positions where the emitted light beams pass right before entering the second lenses 1208. Each of the synchronization mirrors 1210 includes at least one reflection surface formed on one primary-directional end of each of openings for restricting a scanning region of each light beam. The reflection surfaces are bent at a certain angle so as to reflect the light beams on the starting and termination ends of each scan. The light beams reflected form the synchronization mirrors 1210 are detected by the sensors 1211. Like the second lenses 1208, the adjacent synchronization mirrors 1210 are integrally formed with each other.

In the optical scanning device according to this embodiment, where the optical scanning modules 1201 through 1203 of the configuration of FIG. 14 are provided, the adjacent scanning regions are connected, so that image recording can be performed by dividing the image data of one line. Each of the semiconductor laser 1205 is supplied with a modulation signal with a pixel frequency varying with time during one scan from a corresponding write control part after a given period of time passes since an angular displacement of the movable mirror 1100 is detected by a detection signal generated by the sensor 1211 provided on the scanning starting-end side.

The LD 301 forms a light-emission source, the fixed electrodes 305 and 306 and the frequency setting part 307, the voltage control part 308, and the electrode driving parts 309 and 310 form a movable mirror driving part, the synchronization detection sensor 303 form a detection part, the write control part 311, the memory 312, the pulse-width formation part 313, and the PLL circuit 314 form a variable frequency setting part, and the memory 312, the D/A converter 317, and the voltage/current conversion circuit 318 form a variable output setting part of the present invention.

Figure 16:
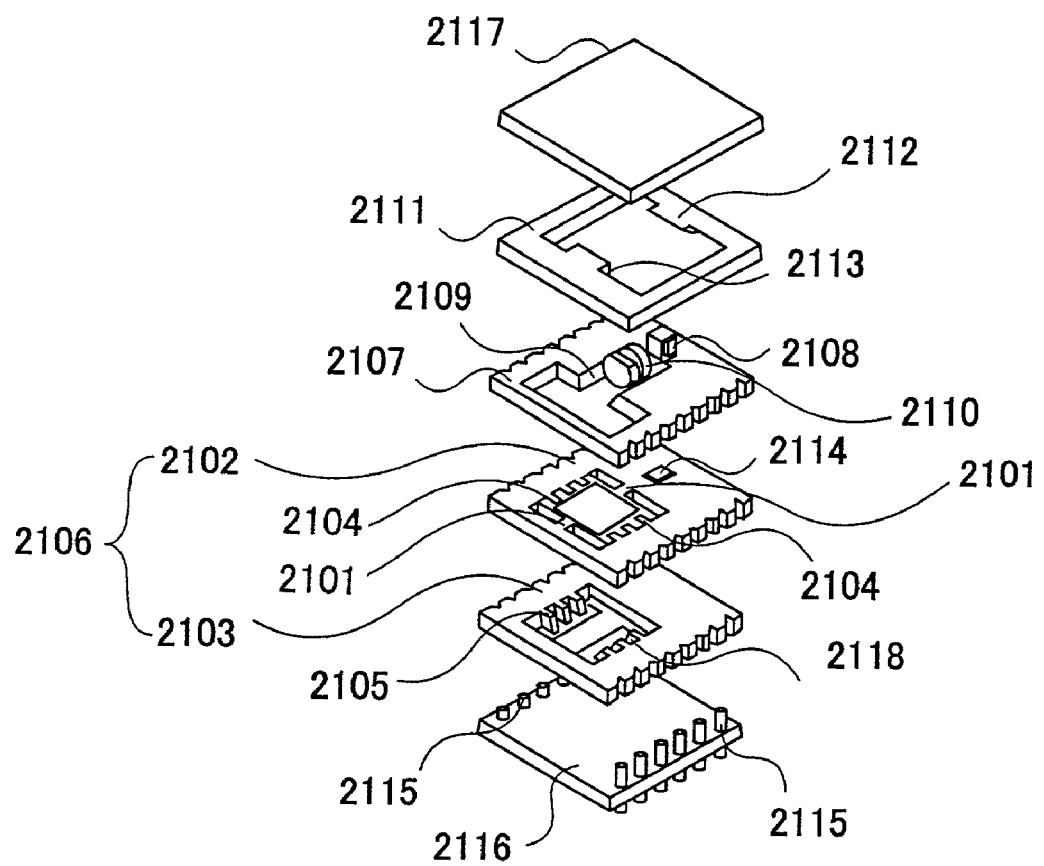
FIG. 16 is a perspective view of an optical scanning module according to a fifth embodiment of the present invention.
Figure 17:
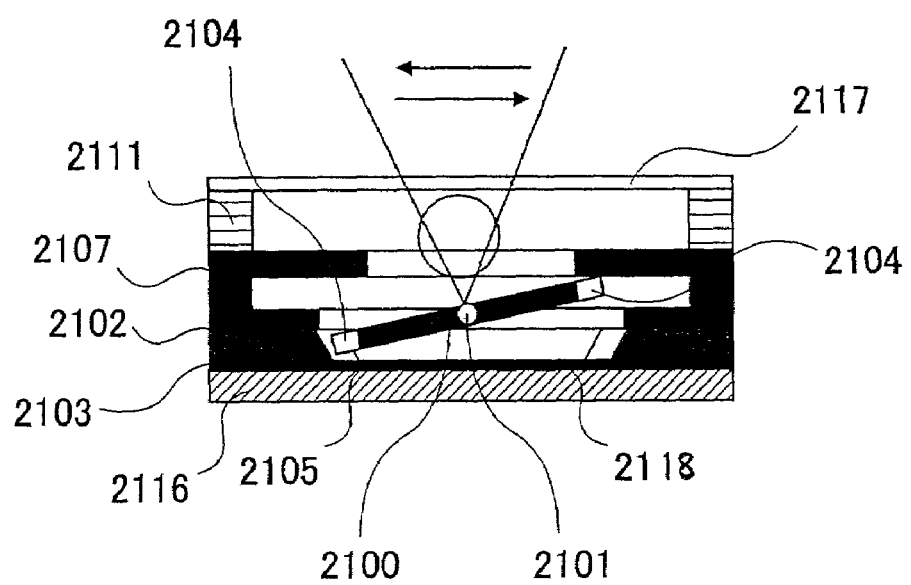
FIG. 17 is a sectional view of the optical scanning module of FIG. 16.

FIG. 16 is a perspective view of an optical scanning module according to a fifth embodiment of the present invention. FIG. 17 is a sectional view of the optical scanning module of FIG. 16. The optical scanning module according to this embodiment has a movable mirror 2100 driven by an electrostatic attraction. In FIGS. 16 and 17, a mirror substrate 2106 is formed by combining first and second silicon (Si) substrates 2102 and 2103. The first Si substrate 2102 is etched so that the movable mirror 2100 and torsion bars 2101 turnably supporting the movable mirror 2100 are formed therein, being surrounded by through holes. The mirror surface of the movable mirror 2100 is formed by vapor-depositing a metal film on the center part thereof. Opposing end parts of the movable mirror 2100 parallel to the torsion bars 2101 are formed to have convex and concave parts arranged like comb teeth. The convex and concave parts form movable electrodes 2104. The second Si substrate 2103 has a concave part for serving as an oscillation space for the movable mirror 2100 formed therein. The concave part has a trapezoidal cross section as shown in FIG. 17. Convex and concave parts are alternately formed like comb teeth at intervals of tens of microns (μm) on the opposing slopes of the concave part so as to correspond to the concave and convex parts of the movable electrodes 2104, respectively, when the first Si substrate 2102 is attached on the second Si substrate 2103, which forms a support base for the movable mirror 2100. The convex and concave parts formed on the slopes of the concave part of the second Si substrate form fixed electrodes 2105 and 2118 opposing the movable electrodes 2104. By alternately applying voltage to the fixed electrodes 2105 and 2118, an electrostatic attraction is generated between the fixed electrode 2105 and the corresponding movable electrode 2104 and between the fixed electrode 2105 and the corresponding movable electrode 2104 so that the movable mirror 2100 can be oscillated.

Further, a driving circuit 2114 applying voltage alternatively to the fixed electrodes 2105 and 2118 based on a driving frequency input thereto is formed on the surface of the first Si substrate 2102 by deposition. A light-source base 2107 is formed of a sintered metal. The light-source base 2107 has an LD chip 2108 joined to its LD mounting surface formed vertically to its joint surface. The light-source base 2107 has a cylindrical coupling lens 2110 joined to a positioning groove 2109 formed therein. The coupling lens 2110 is composed of front and rear lenses. The front lens is an axially symmetrical aspheric lens and the rear lens is a cylinder lens having a curvature in the secondary scanning direction. The groove 2109 has its width set so that the optical axis of the coupling lens 2110 meets the light-emission point of the LD chip 2108 when the outer round surface (longitudinal surface) of the coupling lens 2110 contacts the groove 2109. The coupling lens 2110 is adjusted in the direction of the optical axis so that a divergent bundle of rays emitted from the LD chip 2108 becomes a bundle of parallel rays in the primary scanning direction and a convergent bundle of rays in the secondary scanning direction. Thereafter, the coupling lens 2110 is bonded and fixed to the groove 2109. A spacer substrate 2111 of a frame-like shape is formed by forming a through hole part in the center of a Si substrate by etching. The spacer substrate 2111 has a mirror slope 2112 and a photo diode (PD) 2113 formed on opposing internal sides thereof, respectively, by depositing a GaAs layer so that the mirror slope 2112 downwardly reflects a light beam emitted from the LD chip 2108 and the PD 2113 receives the backlight of the LD chip 2108. A terminal substrate 2116, which is formed of a ceramic material, includes a plurality of terminals 2115 for connection to external circuits. The LD chip 2108, the PD 2113, and the driving circuit 2114 are wire-bonded to the terminals 2115. The terminal substrate 2116, the mirror substrate 2106, the light-source substrate 2107, and the spacer substrate 2111 are superimposed and joined one over the other in the order described, and sealed by a window substrate 2117 formed of a glass plate, thereby forming the optical scanning module.

According to the optical scanning module of the above-described configuration, the light beam emitted from the LD chip 2108 is incident on the movable mirror 2100 via the coupling lens 2110 and the mirror slope 2112. The movable mirror 2100 oscillates in opposite turning directions around the torsion bars 2101 serving as a rotational axis so that the light beam incident on the movable mirror 2100 is upwardly reflected and deflected to be emitted from the optical scanning module for scanning. Letting the size of the mirror slope 2112 or the movable mirror 2100 be a given size, the light beam emitted from the LD chip 2108 has a diameter larger than the given size so that only a reflected part of the light beam is emitted from the optical scanning module. Thereby, the diameter of the light beam emitted from the optical scanning module is defined.

Figure 18:
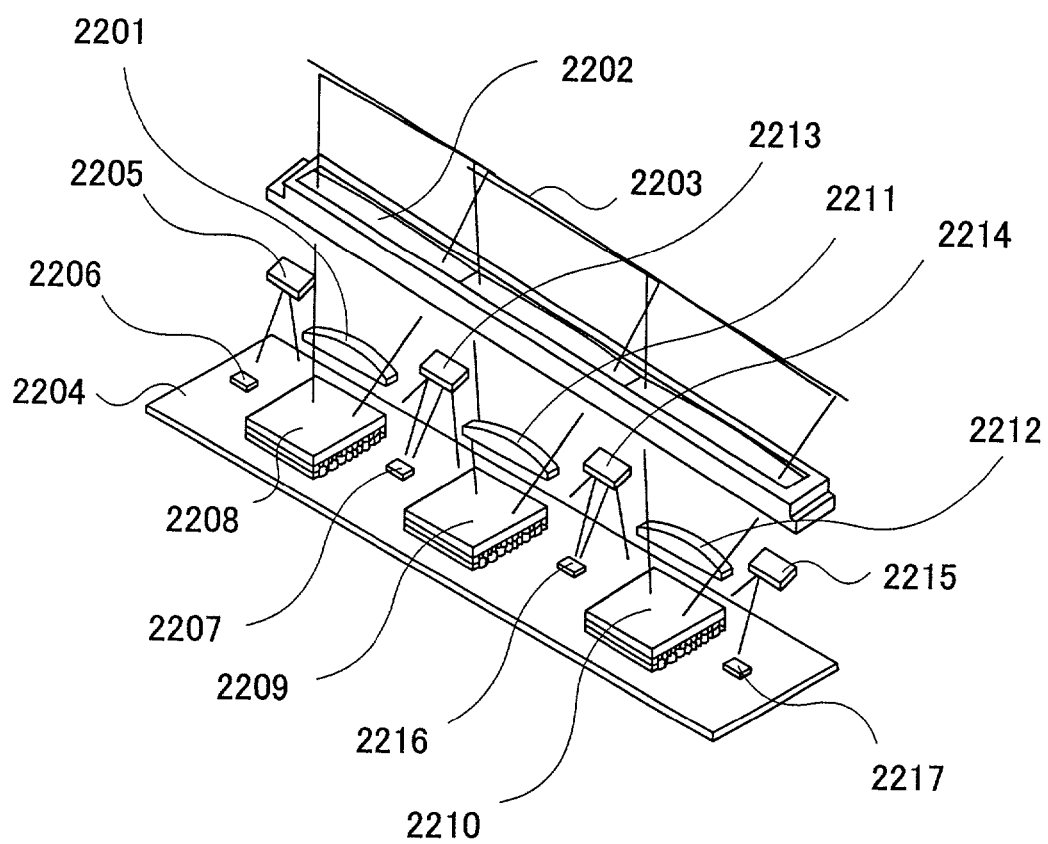
FIG. 18 is an exploded perspective view of an optical scanning device including three optical scanning modules arranged in a primary scanning direction according to the fifth embodiment.

FIG. 18 is a perspective view of an optical scanning device including three optical scanning modules 2208 through 2210 having the configuration of FIGS. 16 and 17 according to the fifth embodiment. A light beam emitted from the optical scanning module 2208 is focused on a scanned surface 2203 by scanning lenses 2201 and 2202 so that image recording is performed. In FIG. 18, image recording is performed by dividing a one-line recording width among the three optical scanning modules 2208 through 2210, which are arranged on a circuit board 2204 in alignment with one another in the primary scanning direction. In each of the optical scanning modules 2208 through 2210, the movable mirror 2100 oscillates in the opposite turning directions so that image recording is performed in both turning directions. In the optical scanning module 2208, for instance, the light beam is reflected toward the circuit board 2204 from mirrors 2205 and 2213 provided in positions corresponding to the sides of the image recording area of the optical scanning module 2208. That is, the positions are outside the image recording area. Then, the light beam is detected by PDs 2206 and 2207 mounted on the circuit board 2204 so that the scanning start and end positions of the light beam are detected. Since the optical scanning modules 2209 and 2210 have the same configuration as the optical scanning module 2208, a description thereof will be omitted. Accordingly, the recording width of each of the optical scanning modules 2208 through 2210 is stably maintained. Thereby, edges of the images formed by each adjacent two of the optical scanning modules 2208 through 2210 fit each other at the joint of the images so that an image of good quality can be obtained.

In FIG. 18, the maximum swing angle of the movable mirror 2100 is ±5°. Of the range of ±5°, a range of ±3° corresponds to the image-recording region. The PDs 206 and 207 are provided within scanning angles corresponding to ranges of ±3° to ±5° outside the image-recording region. The adjacent optical scanning module 2209 is provided so that its scanning region within scanning angles corresponding to a range of ±3° to ±5° of the swing angle overlaps the scanning region of the optical scanning module 2208 within −3° to −5° of the swing angle. The PD 2207 is also used for detecting the scanning start position of the light beam of the optical scanning module 2209. The successive scanning lenses 2202 of the optical scanning modules 2208 through 2210, which are formed integrally with each other by resin molding in this embodiment, may be provided separately from each other.

In this embodiment, in order to reduce a driving voltage, each of the movable electrodes 2104 and the fixed electrodes 2105 and 2118 has the comb teeth-like shape to enlarge the area of its surface, which may be replaced by another electrode configuration.

Figure 19:
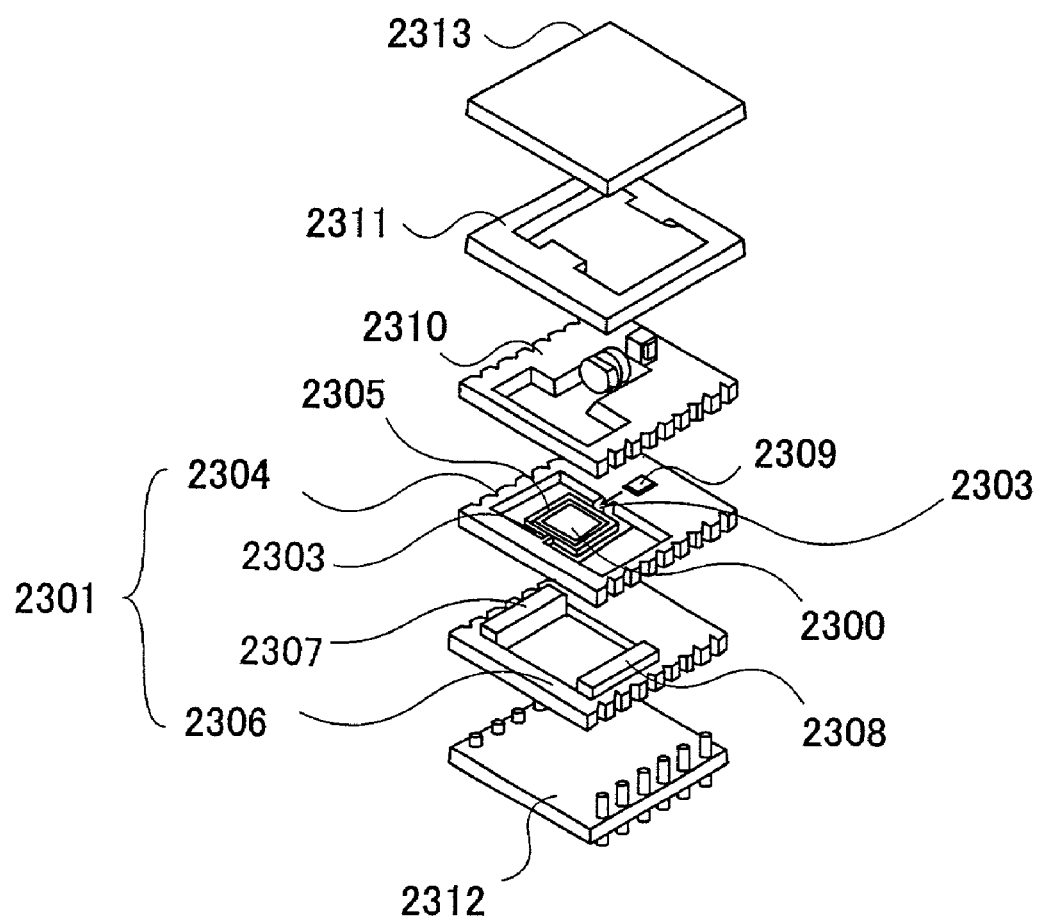
FIG. 19 is an exploded perspective view of an optical scanning module according to a sixth embodiment of the present invention.
Figure 20:
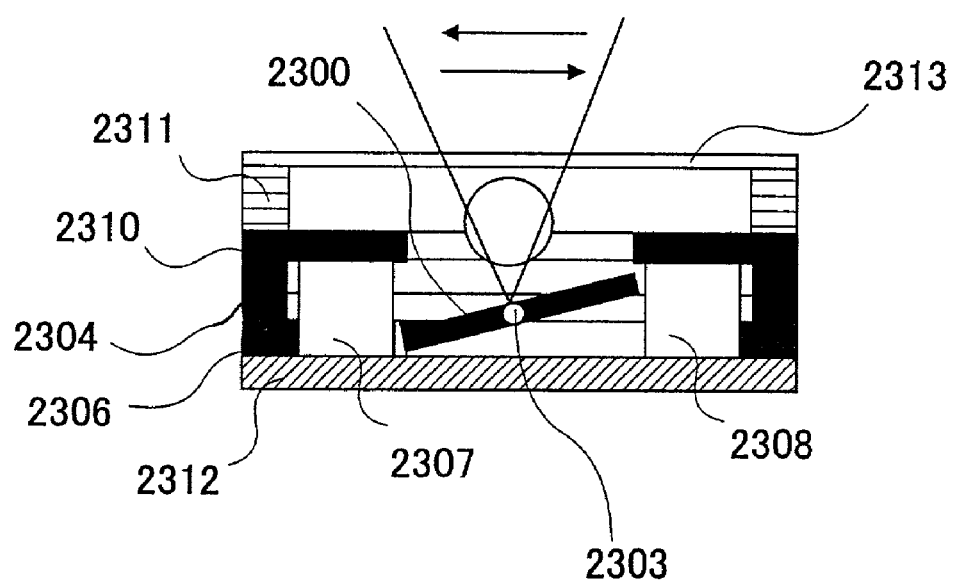
FIG. 20 is a sectional view of the optical scanning module of FIG. 19.

FIG. 19 is an exploded perspective view of an optical scanning module according to a sixth embodiment of the present invention. FIG. 20 is a sectional view of the optical scanning module of FIG. 19. The optical scanning module of this embodiment has a movable mirror 2300 driven by an electromagnetic force. In FIG. 19, a mirror substrate 2301 is formed by combining a Si substrate 2304 and a metal yoke substrate 2306 as shown in FIG. 20. As in the fifth embodiment, the movable mirror 2300 and torsion bars 2303 turnably supporting the movable mirror 2303 are formed in the Si substrate 2304 by forming through holes therein by etching. A mirror is formed of a vapor-deposited metal film on the center part of the movable mirror 2300. A spirally patterned thin-film coil 2305 is formed of an interconnection line introduced through the torsion bars 2303 on the periphery of the movable mirror 2303. The thin-film coil 2305 may be formed on the side of the movable mirror 2300 opposite to the mirror surface. A through hole is formed in the center of the yoke substrate 2306, forming an oscillation space for the movable mirror 2300. The yoke substrate 2306 serves as a support substrate. A pair of magnets 2307 and 2308 are arranged in symmetry with respect to the torsion bars 2303 with the north and south poles of the magnet 2307 opposing the south and north poles of the magnet 2308, respectively, and are fixed on opposing sides of the through hole of the yoke substrate 2306. When an electric current is supplied to the thin-film coil 2305, Lorentz forces are generated in a given turning direction at end parts of the thin-film coil 2305 opposing each other across the torsion bars 2303 by interactions between the electric current and a magnetic field produced by the magnets 2307 and 2308. By switching the directions of the electric current, the movable mirror 2300 can be oscillated. As in the fifth embodiment, a driving circuit 2309 switching voltages applied to the thin-film coil 2305 based on an input driving frequency is formed by deposition on the surface of the Si substrate 2304. A terminal substrate 2312, the mirror substrate 2301, a light-source substrate 2310, and a spacer substrate 2311 are superimposed and joined one over the other in the order described, and sealed by a window substrate 2313, thereby forming the optical scanning module. The substrates 2310, 2311, and 2312 have the same configurations as the corresponding substrates described in the fifth embodiment. An optical scanning device using the optical scanning modules of this embodiment may have the same configuration as described in the fifth embodiment. Therefore, a description thereof will be omitted.

Figure 21:
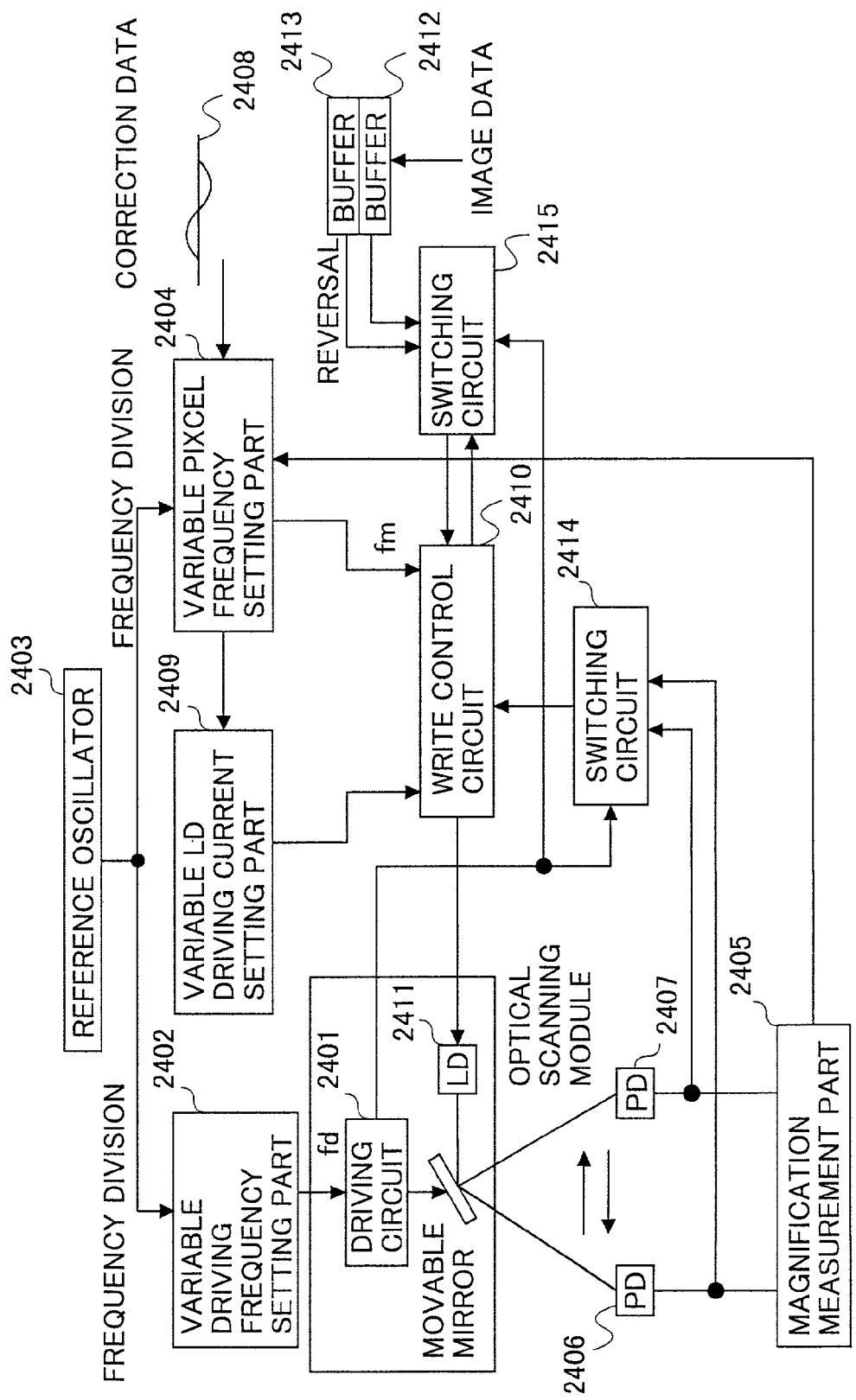
FIG. 21 is a block diagram showing a control circuit of an optical scanning module according to the present invention.

FIG. 21 is a block diagram showing a control circuit of an optical scanning module according to the present invention. In FIG. 21, a variable driving frequency setting part 2402 applies to a driving circuit 2401 of a movable mirror a driving frequency fd of a TTL-level rectangular waveform. The driving frequency fd is common to a plurality of optical scanning modules used in an optical scanning device. The variable driving frequency setting part 2402 frequency-divides a clock signal supplied from a reference oscillator 2403 and varies the driving frequency fd. There are slight peak differences between the resonance frequencies of the movable mirrors of the optical scanning modules. Therefore, the variable driving frequency setting part 2402 selects an approximately center value of the variation width to set the driving frequency fd. At this point, by adjusting the driving voltage, each movable mirror is allowed to have the uniform swing angle at the peaks even if there are peak differences between the resonant frequency and the driving frequency fd. A variable pixel frequency setting part 2404 sets a pixel frequency fin in proportion to the set driving frequency fd, thereby maintaining a constant recording width (scanning magnification) even if a change in a scanning rate is caused by a variation in the resonant frequency of the movable mirror. Further, PDs 2406 and 2407 detects a light beam on both sides of an image-recording region (that is, outside the image recording region) and generates detection signals as previously described. Each detection signal is supplied to a write control circuit 2410 through a switching circuit 2414. Further, a magnification measurement part 2405 measures a time difference between the detection signals on both sides of the image-recording region. The recording width of each optical scanning module can be corrected with a variation over time, such as thermal expansion of a scanning lens, a change in the index of refraction of the scanning lens, or a deviation in the scanning rate on a scanned surface due to a variation in the wavelength of an LD, being allowed for by comparing the measured time difference with its initial value. Further, the pixel frequency fin may be varied during one scan. For instance, if the oscillation turning speed of the movable mirror has an unlinear acceleration or deceleration from an ideal value due to air resistance opposing the turning of the movable mirror or a variation in an electrostatic attraction caused by a change in an inter-electrode gap, partial expansion or contraction of a dot pitch in the primary scanning direction can be corrected by switching the pixel frequency fin in a plurality of steps by supplying correction data 2408 corresponding to the acceleration or deceleration, so that the dot pitch can be uniform on the scanned surface. The correction data 2408, which varies step by step as shown in FIG. 21, is approximate to the pixel frequency fm. In the case shown in FIG. 21, the same driving frequency fd is supplied to each optical scanning module, and the pixel frequency fin is given in each optical scanning module. However, the driving frequency fd may be set individually in each optical scanning module, or the pixel frequency fin may be set common to the optical scanning modules.

A variable LD driving current setting part 2409 controls an electric current supplied to an LD 2411 so that the electric current is inversely proportional to the pixel frequency fin set in the variable pixel frequency setting part 2404. Thereby, an equal amount of energy is supplied for each dot. Buffers 2412 and 2413 alternate in temporarily storing the image data for each scanning line so that the buffer 2412 stores the image data for one scanning line and the buffer 2413 stores the image data for the next scanning line. The image data is read out from its start dot from the buffer 2412 or from its end dot from the buffer 2413 after a given period of time passes since generation of the beam position detection signal on the start side in recording start timing and each scanning direction. Then, the read-out image data supplied through a switching circuit 2415 and the write control circuit 2410 modulates the LD 2411 so that image recording is performed in both (opposite) directions. Therefore, the image data is properly allocated in accordance with the synchronization detection signal (the beam position detection signal on the start side of each scan) without any mistake in the readout order of the image data in the case of scanning in the opposite directions. In this case shown in FIG. 21, the image is recorded in both directions. However, the image may be recorded in every other line, or in only either one of the directions.

FIG. 22 is a timing chart of the detection signals output from the PDs for beam position detection shown in FIG. 18 and write-related timing. A PD1 and a PD2 of FIG. 22 correspond to the PDs 2206 and 2207 of FIG. 18, respectively, and a first electrode and a second electrode of FIG. 22 correspond to the electrodes 2105 and 2118 of FIG. 16, respectively. As shown in FIG. 22, the light beam passes each of the PD1 and PD2 in both forward and backward (opposite) directions. Therefore, two successive outputs are obtained at each of the scanning starting and termination ends. Accordingly, in this case, control is performed to enable only one of the detection signals of the PD1 and PD2 in accordance with the ON-OFF timing of the driving voltages applied to the movable mirror, thereby recognizing a direction in which scanning is performed and selecting one of the detection signals of the PD1 and PD2. That is, in the case of writing in the forward direction, the detection signal of the PD2 and the detection signal of the PD1 output when the applied voltage to the first electrode is in an OFF state may be treated as detection of the scanning termination end and detection of the scanning starting end, respectively. In the case of writing in the backward direction, the detection signal of the PD2 and the detection signal of the PD1 output when the applied voltage to the first electrode is in an ON state may be treated as detection of the scanning starting end and detection of the scanning termination end, respectively. The same effect can be produced by generating a control signal separately based on the detection signals. At this point, by switching the buffers 2412 and 2413, from which the image data is read out, in accordance with the ON-OFF timing of the applied voltages so that only one of the buffers 2412 and 2413 is enabled, the detection signal on the scanning start side can be correlated with the image data by a one-to-one correspondence in each of the scanning directions.

Further, in the case shown in FIG. 22, a time difference between the detection signals on both scanning starting and termination ends is measured, and a recording width is corrected with a variation over time being allowed for by comparing the measured time difference with its initial value. The time difference corresponds to each of T1 and T2 in FIG. 22. The pixel frequency is varied in accordance with variations ΔT1 and ΔT2. By letting a period of time t1 and a period of time t2 each between the detection of the light beam and the start of writing be t1'=t1−ΔT1/2 and t2'=t2−ΔT2/2, respectively, a recording position in forward and backward scanning can be corrected based on the center of the image.

In the second embodiment, the same effect can be obtained by correlating ON and OFF of each applied voltage with the positive and negative voltages applied to the thin-film coil 2305, respectively.

FIG. 23 is a timing chart showing another timing. In the case of FIG. 23, the PD1 and PD2 are different from those of FIG. 22, and the positions of the PD1 and PD2 or the swing angle is set so that the light beam is turned within the range of each of the PD1 and PD2. The swing angle may be set by adjusting the driving voltages so that the light beam reflected from the movable mirror at its maximum swing angle reaches positions corresponding to the positions of the PD1 and PD2. Thereby, each of the PD1 and PD2 outputs the detection signal only once although the light beam scans in both directions. By recognizing the rising and falling edges of the detection signal as detection of the scanning starting end and detection of the scanning termination end, respectively, the scanning direction can be recognized. In this embodiment, a phase difference between the driving frequencies of the two adjacent optical scanning modules is 0°. Therefore, the optical scanning modules scan in the same direction at the same time so as to prevent the light beams of the optical scanning modules from entering the same or shared PD at the same timing.

Figure 24A:
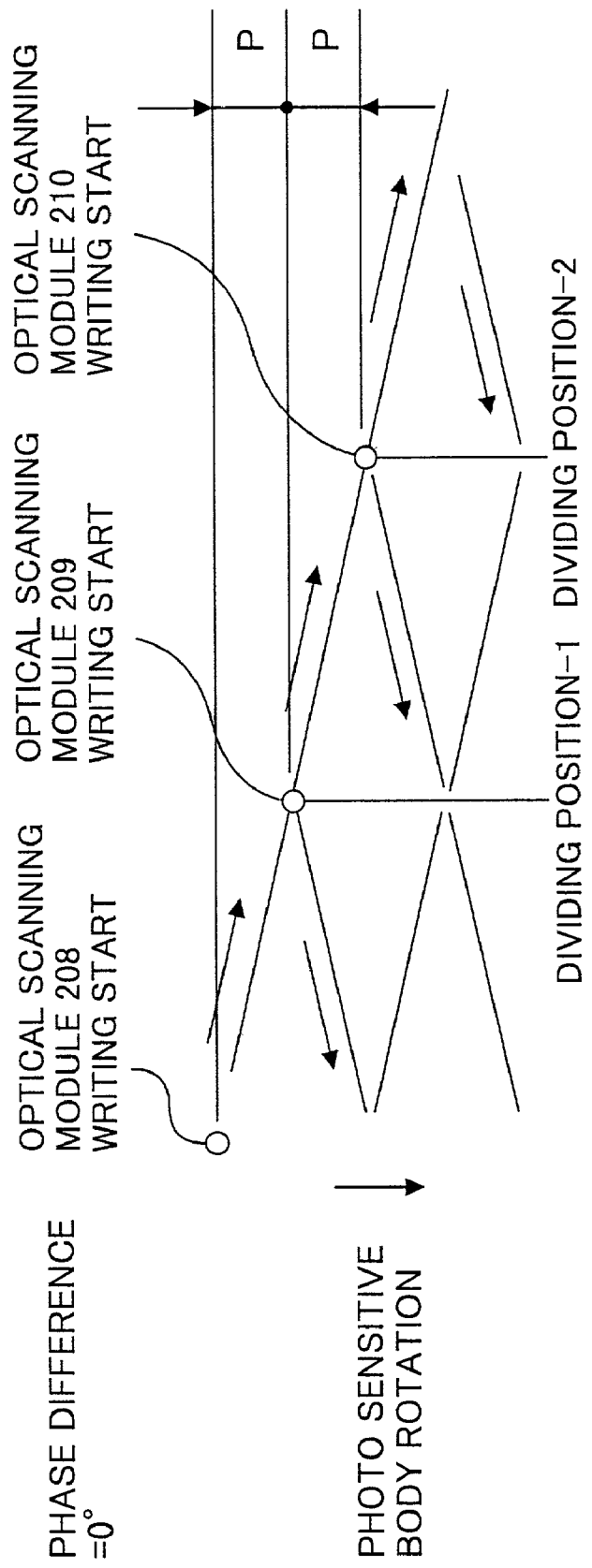
FIGS. 24A and 24B are diagrams showing scanning lines of the optical scanning modules on a scanned surface of a photosensitive body in consideration of a rotation thereof.
Figure 24B:
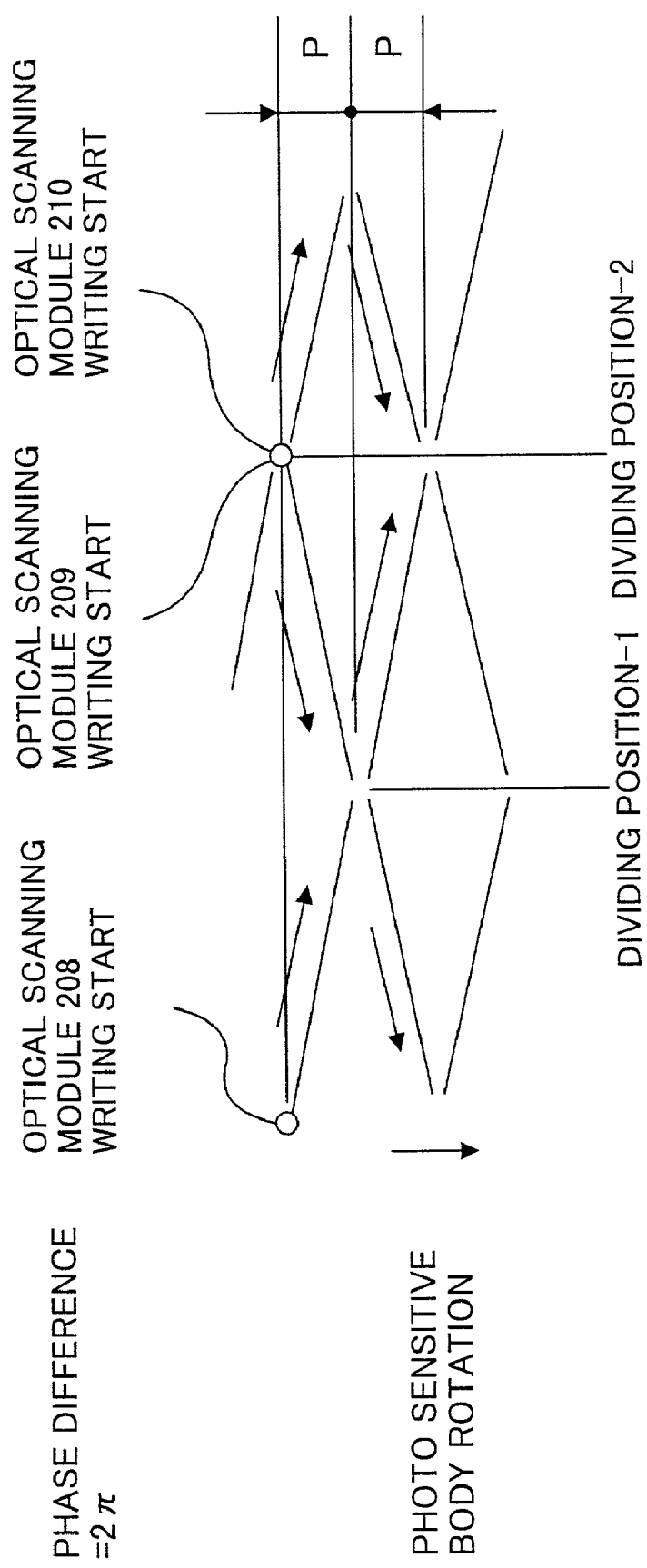

FIGS. 24A and 24B are diagrams showing scanning lines of the optical scanning modules 2208 through 2210 on the scanned surface of a photosensitive body in consideration of the rotation thereof. An image is recorded on the scanned surface that is rotated by one scanning pitch P during a period between the start and end of a scan by each of the optical scanning modules 2208 through 2210. Therefore, when a phase difference between the driving frequencies of each adjacent two of the optical scanning modules 2208 through 2210 is set to 0° as shown in FIG. 24A, there is a difference of the one scanning pitch P in the secondary scanning direction between the positions of two dots at each dividing position since there is a difference between recording start and end times. If the scanning lines are formed at a higher density with respect to an amount of rotation of the photosensitive body, the difference between the two dot positions can be ignored. However, if the scanning lines are formed at a lower density, each dividing position is apt to stand out. Therefore, in the case of FIG. 24A, line images are connected by setting the scanning positions of each adjacent two of the optical scanning modules 2208 through 2210 so that there is a difference of the one scanning pitch P in the secondary scanning direction between each adjacent two dot positions at respective recording start points. In this case, the light beams of each adjacent two of the optical scanning modules 2208 through 2210 may enter the same PD for beam position detection at the same timing. However, by setting the phase difference between the driving frequencies of each adjacent two of the optical scanning modules 2208 through 2210 to 180° so that the adjacent light beams scan the scanned surface in the opposite directions as shown in FIG. 24B, the adjacent scanning light beams are allowed to pass the corresponding dividing position at the same time. Thereby, the rotation of the scanned surface is prevented from causing a difference between dot positions in the secondary scanning direction.

Figure 25:
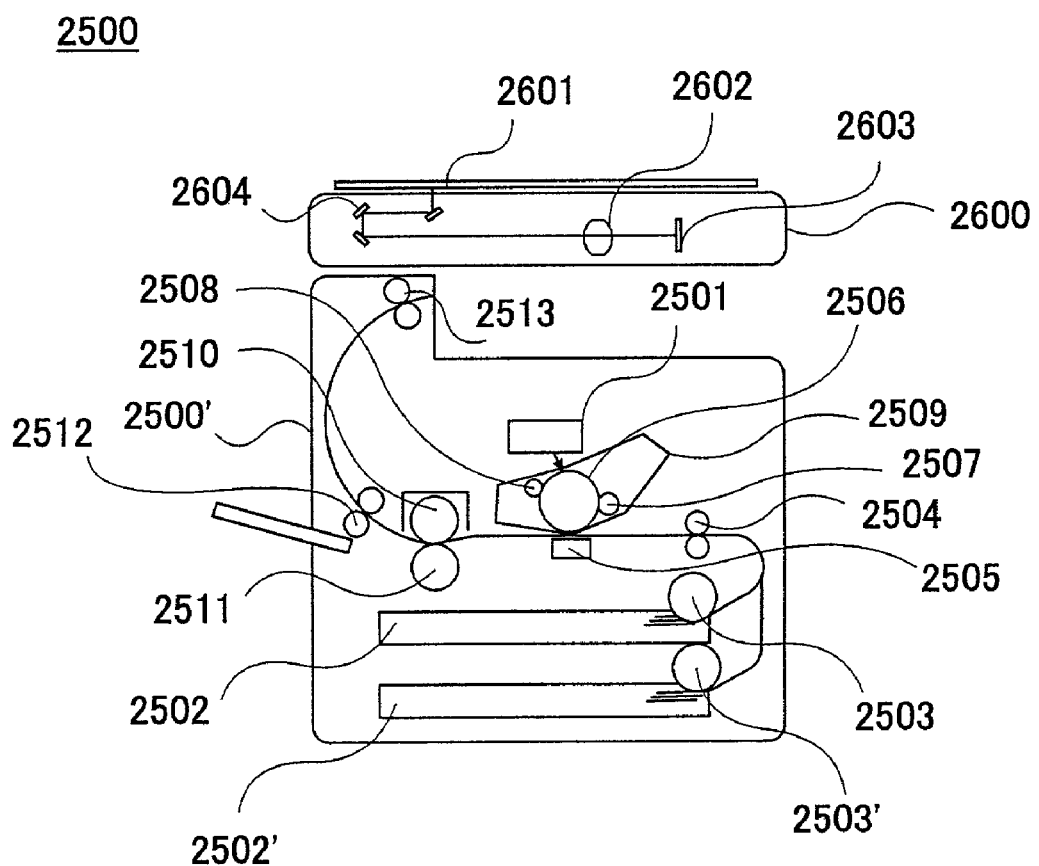
FIG. 25 is a schematic sectional view of a digital copier in which an optical scanning device according to the present invention is mounted.
Figure 26:
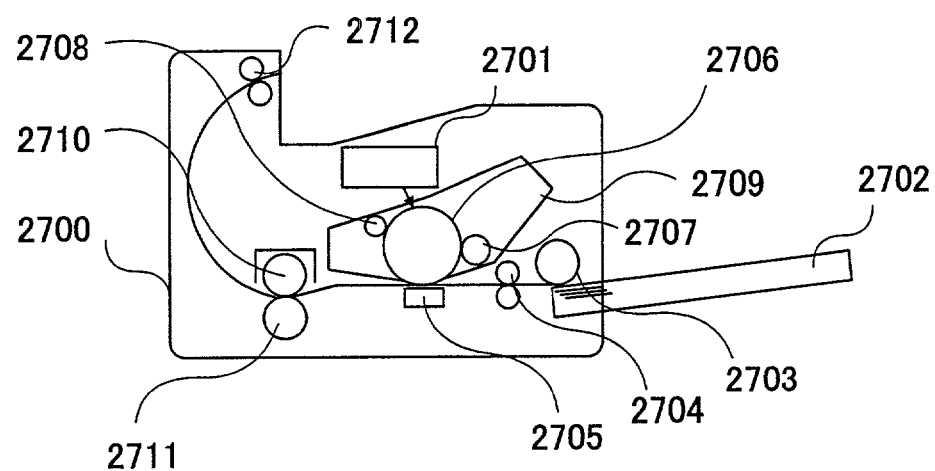
FIG. 26 is a schematic sectional view of a laser printer in which an optical scanning device according to the present invention is mounted.
Figure 27:
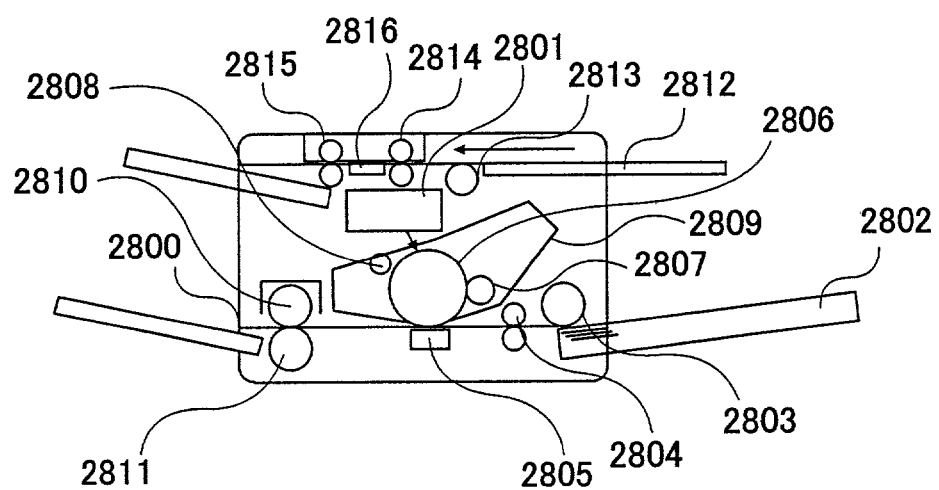
FIG. 27 is a schematic sectional view of a plain-paper facsimile machine in which an optical scanning device according to the present invention is mounted.

Next, a description will be given, with reference to FIGS. 25 through 27, an imaging apparatus employing an electrophotographic process in which imaging apparatus the optical scanning device according to the fifth or sixth embodiment of the present invention is mounted. FIG. 25 is a diagram showing a digital copier 2500 that is an example of the imaging apparatus. FIG. 26 is a diagram showing a laser printer 2700 that is another example of the imaging apparatus. FIG. 27 is a diagram showing a plain-paper facsimile machine 2800 that is yet another example of the imaging apparatus.

In FIG. 25, the digital copier 2500 includes a copier main body 2500' and an original reading device main body 2600. The copier main body 2500' includes an optical scanning device 2501, cassettes 2502 and 2502' for containing paper sheets, paper feed rollers 2503 and 2503' drawing the paper sheets one by one from the cassettes 2502 and 2502', registration rollers 2504 controlling sheet conveyance timing, a transfer charger 2505, a process cartridge 2509 formed by integrating a photosensitive body drum 2506, a development roller 2507, and a charging roller 2508, a fuser roller 2510 containing a halogen heater, a fuser 2511 formed of a pressure roller, conveying rollers 2512, and paper ejection rollers 2513. The optical scanning device 2501 in the digital copier having the above-described configuration has its semiconductor lasers modulated in accordance with an image signal and forms a latent image on the photosensitive body drum 2506 uniformly charged by the charging roller 2508. The latent image is made visible by toner supplied from the development roller 2507. A paper sheet drawn by the paper feed roller 2503 or 2503' is conveyed by the registration rollers 2504 in timing with the start of image recording by the optical scanning device 2501 so that a toner image is transferred on the paper sheet. The transferred image is fixed by the fuser roller 2510 and the fuser 2511 and conveyed by the conveying rollers 2512 to be ejected by the paper ejection rollers 2513. Further, in the document reading device main body 2600, by moving a group of mirrors 2604, the images of an original fixed to an original placement table are read by a reading part 2601 and successively formed on a photoelectric conversion element 2603 such as a CCD through a focusing lens 2602 to be converted into electronic data. The digital copier of FIG. 25 is a monochrome copier, but is not limited thereto. In the case of a full-color copier, it is obvious that the present invention can be applied to an imaging apparatus in which the optical scanning device of the present invention is provided for each of process cartridges of different colors, for a single imaging part performing full-color image formation, or for each of a plurality of imaging parts.

In FIG. 26, the laser printer 2700 includes an optical scanning device 2701, a cassette 2702 containing paper sheets, a paper feed roller 2703 drawing the paper sheets one by one from the cassette 2702, registration rollers 2704 controlling sheet conveyance timing, a transfer charger 2705, a process cartridge 2709 formed by integrating a photosensitive body drum 2706, a development roller 2707, and a charging roller 2708, a fuser roller 2710 containing a halogen heater, and a fuser 2711 formed of a pressure roller, and a paper ejection roller 2712. The optical scanning device 2701 in the laser printer 2700 having the above-described configuration have its semiconductor lasers modulated in accordance with an image signal supplied from a host computer and forms a latent image on the photosensitive body drum 2706 uniformly charged by the charging roller 2708. The latent image is made visible by toner supplied from the development roller 2708. A paper sheet drawn by the paper feed roller 2703 is conveyed by the registration rollers 2704 in timing with the start of image recording by the optical scanning device 2701 so that a toner image is transferred on the paper sheet. The transferred image is fixed by the fuser roller 2710 and the fuser 2711 to be ejected by the paper ejection rollers 2712.

In FIG. 27, the plain-paper facsimile machine 2800 includes an optical scanning device 2801, a cassette 2802 containing paper sheets, a paper feed roller 2803 drawing the paper sheets one by one from the cassette 2802, registration rollers 2804 controlling sheet conveyance timing, a transfer charger 2805, a process cartridge formed by integrating a photosensitive body drum 2806, a development roller 2807, and a charging roller 2808, a fuser roller 2810 containing a halogen heater, a fuser 2811 formed of a pressure roller, a paper feed roller 2813 drawing an original from an original placement table 2812, a pair of conveying rollers 2814 and 2815 conveying the original in the secondary scanning direction, and a reading part 2816 that optically reads the images of the original. The images of the original, which is fed forward by the paper feed roller 2813 from the original placement table 2812, are successively converted into electronic data by the reading part 2816 while the original is conveyed by the conveying rollers 2814 and 2815. As described above, in the plain-paper facsimile machine 2800, an image signal supplied from the reading part 2816 is transmitted through a transmission part (not shown in the drawing) so that the optical scanning device 2801 has its semiconductor lasers modulated in accordance with the image signal received through the transmission part and forms a latent image on the photosensitive body drum 2806 uniformly charged by the charging roller 2808. The latent image is made visible by toner supplied from the development roller 2807. A paper sheet drawn by the paper feed roller 2803 is conveyed by the registration rollers 2804 in timing with the start of image recording by the optical scanning device 2801 so that a toner image is transferred on the paper sheet. The transfer image is fixed by the fuser roller 2810 and the fuser 2811 to be ejected.

According to the optical scanning device of the present invention, one scan by the optical scanning device is divided in the number of optical scanning modules thereof so as to narrow the scanning width of each optical scanning module. Thereby, the swing angle of the movable mirror of each optical scanning module can be limited within the range of oscillation using resonance, so that the movable mirror can move at a higher speed with a higher scanning frequency. Further, the optical scanning device requires less power at the time of activation so as to achieve power saving.

Further, the optical scanning device of the present invention includes the variable pixel frequency setting part, so that a deviation of the recording width (magnification) of each optical scanning module due to correction of the oscillation frequency thereof can be corrected. Thereby, an edge of an image formed by one optical scanning module coincides with an edge of an image formed by an adjacent optical scanning module at the joint of the images, thus realizing an image of good quality.

The present invention is not limited to the specifically disclosed embodiments, but variations and modifications may be made without departing from the scope of the present invention.

The present application is based on Japanese priority applications No. 2001-056304 filed on Mar. 1, 2001, No. 2001-077089 filed on Mar. 16, 2001, and No. 2001-292586 filed on Sep. 25, 2001, the entire contents of which are hereby incorporated by reference.

What is claimed is:

1. An optical scanning module comprising:
   a light-emission source configured to emit a light beam;
   a movable mirror configured to reflect the light beam, the movable mirror being swingably supported by a rotary shaft; and
   a movable mirror driving part that is configured to cause said movable mirror to oscillate in first and second opposite directions,
   wherein a frequency of pixel information supplied to said light-emission source varies in accordance with a primary scanning position of each pixel.

2. The optical scanning module as claimed in claim 1, further comprising a detection part configured to detect a displacement of said movable mirror,
   wherein a frequency modulation section is set to start after a given period of time passes since a detection signal is obtained from said detection part; and a frequency causing said light-emission source to emit light is varied within the frequency modulation section.

3. The optical scanning module as claimed in claim 2, wherein a start timing of the frequency modulation section is varied based on the detection signal obtained from said detection part.

4. The optical scanning module as claimed in claim 2, wherein said movable mirror driving part varies an amplitude of said movable mirror so that a predetermined detection signal value may be obtained in said detection part.

5. The optical scanning module as claimed in claim 4, wherein said movable mirror driving part gradually increases the amplitude of said movable mirror until the predetermined detection signal value is obtained in said detection part in starting said movable mirror.

6. The optical scanning module as claimed in claim 4, wherein said light-emission source is inhibited from starting image writing before the predetermined detection signal value is obtained in said detection part.

7. The optical scanning module as claimed in claim 4, wherein said movable mirror driving part stops driving said movable mirror if the predetermined detection signal value is prevented from being obtained in said detection part within a given time limit.

8. The optical scanning module as claimed in claim 1, further comprising:
   a detection part configured to detect a displacement of said movable mirror; and
   a variable output setting part that is configured to set a frequency variation section so that the frequency variation section starts after a given period of time passes since a detection signal is obtained from said detection part, and that is configured to vary a light-emission output of said light-emission source in accordance with the primary scanning position.

9. The optical scanning module as claimed in claim 1, wherein said movable mirror driving part reduces or stops a rotational oscillation force provided to said movable mirror at least in a period other than an image writing period.

10. The optical scanning module as claimed in claim 9, wherein said movable mirror driving part gradually increases the amplitude of said movable mirror until the predetermined detection signal value is obtained in said detection part in starting said movable mirror.

11. The optical scanning module as claimed in claim 9, wherein said light-emission source is inhibited from starting image writing before the predetermined detection signal value is obtained in said detection part.

12. The optical scanning module as claimed in claim 9, wherein said movable mirror driving part stops driving said movable mirror if the predetermined detection signal value is prevented from being obtained in said detection part within a given time limit.

13. An optical scanning module comprising:
a light-emission source configured to emit a light beam;
a movable mirror configured to reflect the light beam, the movable mirror being swingably supported by a rotary shaft; and
a movable mirror driving part that that is configured to cause said movable mirror to oscillate in first and second opposite directions,
wherein a frequency causing said light-emission source to emit light based on pixel information varies in accordance with a primary scanning position.

14. The optical scanning module as claimed in claim 13, further comprising a detection part configured to detect a displacement of said movable mirror,
wherein a frequency modulation section is set to start after a given period of time passes since a detection signal is obtained from said detection part; and the frequency causing said light-emission source to emit light is varied within the frequency modulation section.

15. The optical scanning module as claimed in claim 14, wherein a start timing of the frequency modulation section is varied based on the detection signal obtained from said detection part.

16. The optical scanning module as claimed in claim 14, wherein said movable mirror driving part varies an amplitude of said movable mirror so that a predetermined detection signal value may be obtained in said detection part.

17. The optical scanning module as claimed in claim 16, wherein said movable mirror driving part gradually increases the amplitude of said movable mirror until the predetermined detection signal value is obtained in said detection part in starting said movable mirror.

18. The optical scanning module as claimed in claim 16, wherein said light-emission source is inhibited from starting image writing before the predetermined detection signal value is obtained in said detection part.

19. The optical scanning module as claimed in claim 16, wherein said movable mirror driving part stops driving said movable mirror if the predetermined detection signal value is prevented from being obtained in said detection part within a given time limit.

20. The optical scanning module as claimed in claim 13, further comprising:
a detection part that is configured to detect a displacement of said movable mirror; and
a variable output setting part that is configured to set a frequency variation section so that the frequency variation section starts after a given period of time passes since a detection signal is obtained from said detection part, and is configured to vary a light-emission output of said light-emission source in accordance with the primary scanning position.

21. The optical scanning module as claimed in claim 13, wherein said movable mirror driving part reduces or stops a rotational oscillation force provided to said movable mirror at least in a period other than an image writing period.

22. The optical scanning module as claimed in claim 21, wherein said movable mirror driving part gradually increases the amplitude of said movable mirror until the predetermined detection signal value is obtained in said detection part in starting said movable mirror.

23. The optical scanning module as claimed in claim 21, wherein said light-emission source is inhibited from starting image writing before the predetermined detection signal value is obtained in said detection part.

24. The optical scanning module as claimed in claim 21, wherein said movable mirror driving part stops driving said movable mirror if the predetermined detection signal value is prevented from being obtained in said detection part within a given time limit.

25. An optical scanning module comprising:
a light-emission source configured to emit a light beam;
a movable mirror configured to reflect the light beam, the movable mirror being swingably supported by a rotary shaft;
a movable mirror driving part that is configured to cause said movable mirror to oscillate in first and second opposite directions; and
a variable frequency setting part varying, in accordance with an amplitude of said movable mirror, a frequency causing said light-emission source to emit light based on pixel information.

26. The optical scanning module as claimed in claim 25, further comprising a detection part configured to detect a displacement of said movable mirror,
wherein a frequency modulation section is set to start after a given period of time passes since a detection signal is obtained from said detection part; and the frequency causing said light-emission source to emit light is varied within the frequency modulation section.

27. The optical scanning module as claimed in claim 26, wherein a start timing of the frequency modulation section is varied based on the detection signal obtained from said detection part.

28. The optical scanning module as claimed in claim 26, wherein said movable mirror driving part varies the amplitude of said movable mirror so that a predetermined detection signal value may be obtained in said detection part.

29. The optical scanning module as claimed in claim 28, wherein said movable mirror driving part gradually increases the amplitude of said movable mirror until the predetermined detection signal value is obtained in said detection part in starting said movable mirror.

30. The optical scanning module as claimed in claim 28, wherein said light-emission source is inhibited from starting image writing before the predetermined detection signal value is obtained in said detection part.

31. The optical scanning module as claimed in claim 28, wherein said movable mirror driving part stops driving said movable mirror if the predetermined detection signal value is prevented from being obtained in said detection part within a given time limit.

32. The optical scanning module as claimed in claim 25, further comprising:
a detection part that is configured to detect a displacement of said movable mirror; and
a variable output setting part that is configured to set a frequency variation section so that the frequency variation section starts after a given period of time passes since a detection signal is obtained from said detection part, and that is configured to vary a light-emission output of said light-emission source in accordance with a primary scanning position.

33. The optical scanning module as claimed in claim 25, wherein said movable mirror driving part reduces or stops a rotational oscillation force provided to said movable mirror at least in a period other than an image writing period.

34. The optical scanning module as claimed in claim 33, wherein said movable mirror driving part gradually increases the amplitude of said movable mirror until the predetermined detection signal value is obtained in said detection part in starting said movable mirror.

35. The optical scanning module as claimed in claim 33, wherein said light-emission source is inhibited from starting image writing before the predetermined detection signal value is obtained in said detection part.

36. The optical scanning module as claimed in claim 33, wherein said movable mirror driving part stops driving said movable mirror if the predetermined detection signal value is prevented from being obtained in said detection part within a given time limit.

37. An optical scanning module comprising:
a light-emission source configured to emit a light beam;
a movable mirror configured to reflect the light beam, the movable mirror being swingably supported by a rotary shaft; and
a movable mirror driving part that is configured to cause said movable mirror to oscillate in first and second opposite directions,
wherein a light emission period forming one pixel on a scanned surface is varied with respect to a primary scanning direction to be minimized in a vicinity of a center of an image so that a light-emission interval between each of pixels forming pixel information is minimized in the vicinity of the center of the image.

38. The optical scanning module as claimed in claim 37, further comprising a detection part configured to detect a displacement of said movable mirror,
wherein a frequency modulation section is set to start after a given period of time passes since a detection signal is obtained from said detection part; and a frequency causing said light-emission source to emit light is varied within the frequency modulation section.

39. The optical scanning module as claimed in claim 38, wherein a start timing of the frequency modulation section is varied based on the detection signal obtained from said detection part.

40. The optical scanning module as claimed in claim 38, wherein said movable mirror driving part varies an amplitude of said movable mirror so that a predetermined detection signal value may be obtained in said detection part.

41. The optical scanning module as claimed in claim 40, wherein said movable mirror driving part gradually increases the amplitude of said movable mirror until the predetermined detection signal value is obtained in said detection part in starting said movable mirror.

42. The optical scanning module as claimed in claim 40, wherein said light-emission source is inhibited from starting image writing before the predetermined detection signal value is obtained in said detection part.

43. The optical scanning module as claimed in claim 40, wherein said movable mirror driving part stops driving said movable mirror if the predetermined detection signal value is prevented from being obtained in said detection part within a given time limit.

44. The optical scanning module as claimed in claim 37, further comprising:
a detection part that is configured to detect a displacement of said movable mirror; and
a variable output setting part that is configured to set a frequency variation section so that the frequency variation section starts after a given period of time passes since a detection signal is obtained from said detection part, and that is configured to vary a light-emission output of said light-emission source in accordance with a primary scanning position.

45. The optical scanning module as claimed in claim 37, wherein said movable mirror driving part reduces or stops a rotational oscillation force provided to said movable mirror at least in a period other than an image writing period.

46. The optical scanning module as claimed in claim 45, wherein said movable mirror driving part gradually increases the amplitude of said movable mirror until the predetermined detection signal value is obtained in said detection part in starting said movable mirror.

47. The optical scanning module as claimed in claim 45, wherein said light-emission source is inhibited from starting image writing before the predetermined detection signal value is obtained in said detection part.

48. The optical scanning module as claimed in claim 45, wherein said movable mirror driving part stops driving said movable mirror if the predetermined detection signal value is prevented from being obtained in said detection part within a given time limit.

49. An optical scanning device comprising:
a plurality of optical scanning modules arranged so that primary scanning directions thereof coincide with each other, the optical scanning modules each comprising:
a light-emission source configured to emit a light beam;
a movable mirror configured to reflect the light beam, the movable mirror being swingably supported by a rotary shaft; and
a movable mirror driving part that is configured to cause said movable mirror to oscillate in first and second opposite directions,
wherein a frequency of pixel information supplied to said light-emission source varies in accordance with a primary scanning position of each pixel.

50. The optical scanning device as claimed in claim 49, wherein said light-emission source is modulated in accordance with image data; and
said movable mirror driving part causes said movable mirror to oscillate by periodically generating attraction or a repulsive force between said support substrate and said movable mirror by switching voltages applied to said movable mirror driving part, said movable mirror driving part being provided on both of end parts of said movable mirror, the end parts being positioned on opposite sides of the rotary shaft.

51. The optical scanning device as claimed in claim 50, wherein the light beam emitted from said light-emission source of each of said optical scanning modules is caused to scan a region in the primary scanning direction by said movable mirror so that image recording is performed by connecting the regions scanned by the light beams of said optical scanning modules.

52. The optical scanning device as claimed in claim 51, further comprising a variable pixel frequency setting part that is configured to vary the pixel frequency modulating said light-emission source in accordance with an amount of oscillation of said movable mirror.

53. The optical scanning device as claimed in claim 52, further comprising beam detection parts each configured to detect a position of the light beam deflected by said movable mirror, the beam detection parts being provided outside the scanned region at positions corresponding to scanning starting and termination ends of each of the optical scanning modules, respectively, wherein said variable pixel frequency setting part varies the pixel frequency based on a scanning period between detections of the light beam by the beam detection parts.

54. The optical scanning device as claimed in claim 52, wherein said variable pixel frequency setting part varies the pixel frequency in a plurality of steps during one scan.

55. The optical scanning device as claimed in claim 52, further comprising a variable driving current setting part that varies, in accordance with the pixel frequency, a driving current supplied to said light-emission source so as to vary an amount of light emitted therefrom.

56. The optical scanning device as claimed in claim 51, further comprising a beam detection part configured to detect a position of the light beam deflected by said movable mirror, the beam detection part being provided outside the scanned region at a position corresponding to a scanning starting end of each of the optical scanning modules,
wherein one of a plurality of detection signals output from the beam detection part is selected as a reference signal for starting image writing in accordance with an on-off timing of the driving voltages applied to said movable mirror driving part.

57. The optical scanning device as claimed in claim 51, further comprising a beam detection part configured to detect a position of the light beam deflected by said movable mirror, the beam detection part being provided outside the scanned region of each of the optical scanning modules,
wherein the light beam is turned within a region detectable by said beam detection part so as to perform scanning in the first and second opposite directions.

58. The optical scanning device as claimed in claim 51, wherein the optical scanning modules are arranged so that the scanned regions of each adjacent two of the optical scanning modules are apart from each other by one scanning pitch in a secondary scanning direction; and
timing phases of the driving voltages applied to the movable mirror driving parts of the optical scanning modules coincide substantially.

59. The optical scanning device as claimed in claim 51, further comprising a pair of buffer parts configured to alternate in temporarily storing the image data so that each of the buffer parts is configured to store image data for every other scanning line,
wherein the light beam emitted from said light-emission source is deflected by said movable mirror so as to scan the scanned region in the first and second opposite directions; and the image data is read out alternately from the paired buffer parts in first and second respective orders reverse to each other based on timing of the driving voltages applied to said movable mirror driving part.

60. An optical scanning device comprising:
a plurality of optical scanning modules arranged so that primary scanning directions thereof coincide with each other, the optical scanning modules each comprising:
a light-emission source configured to emit a light beam;
a movable mirror configured to reflect the light beam, the movable mirror being swingably supported by a rotary shaft; and
a movable mirror driving part that is configured to cause said movable mirror to oscillate in first and second opposite directions,
wherein a frequency causing said light-emission source to emit light based on pixel information varies in accordance with a primary scanning position.

61. The optical scanning device as claimed in claim 60, wherein said light-emission source is modulated in accordance with image data; and
said movable mirror driving part causes said movable mirror to oscillate by periodically generating attraction or a repulsive force between said support substrate and said movable mirror by switching voltages applied to said movable mirror driving part, said movable mirror driving part being provided on both of end parts of said movable mirror, the end parts being positioned on opposite sides of each of the rotary shaft.

62. The optical scanning device as claimed in claim 61, wherein the light beam emitted from said light-emission source of each of said optical scanning modules is caused to scan a region in the primary scanning direction by said movable mirror so that image recording is performed by connecting the regions scanned by the light beams of said optical scanning modules.

63. The optical scanning device as claimed in claim 62, further comprising a variable pixel frequency setting part that is configured to vary the pixel frequency modulating said light-emission source in accordance with an amount of oscillation of said movable mirror.

64. The optical scanning device as claimed in claim 63, further comprising beam detection parts each configured to detect a position of the light beam deflected by said movable mirror, the beam detection parts being provided outside the scanned region at positions corresponding to scanning starting and termination ends of each of the optical scanning modules, respectively,
wherein said variable pixel frequency setting part varies the pixel frequency based on a scanning period between detections of the light beam by the beam detection parts.

65. The optical scanning device as claimed in claim 63, wherein said variable pixel frequency setting part varies the pixel frequency in a plurality of steps during one scan.

66. The optical scanning device as claimed in claim 63, further comprising a variable driving current setting part that varies, in accordance with the pixel frequency, a driving current supplied to said light-emission source so as to vary an amount of light emitted therefrom.

67. The optical scanning device as claimed in claim 62, further comprising a beam detection part configured to detect a position of the light beam deflected by said movable mirror, the beam detection part being provided outside the scanned region at a position corresponding to a scanning starting end of each of the optical scanning modules,
wherein one of a plurality of detection signals output from the beam detection part is selected as a reference signal for starting image writing in accordance with an on-off timing of the driving voltages applied to said movable mirror driving part.

68. The optical scanning device as claimed in claim 62, further comprising a beam detection part configured to detect a position of the light beam deflected by said movable mirror, the beam detection part being provided outside the scanned region of each of the optical scanning modules,
wherein the light beam is turned within a region detectable by said beam detection part so as to perform scanning in the first and second opposite directions.

69. The optical scanning device as claimed in claim 62, wherein the optical scanning modules are arranged so that the scanned regions of each adjacent two of the optical scanning modules are apart from each other by one scanning pitch in a secondary scanning direction; and timing phases of the driving voltages applied to the movable mirror driving parts of the optical scanning modules coincide substantially.

70. The optical scanning device as claimed in claim 62, further comprising a pair of buffer parts configured to alternate in temporarily storing the image data so that each of the buffer parts is configured to store image data for every other scanning line, wherein the light beam emitted from said light-emission source is deflected by said movable mirror so as to scan the scanned region in the first and second opposite directions; and the image data is read out alternately from the paired buffer parts in first and second respective orders reverse to each other based on timing of the driving voltages applied to said movable mirror driving part.

71. An optical scanning device comprising:

a plurality of optical scanning modules arranged so that primary scanning directions thereof coincide with each other, the optical scanning modules each comprising:

a light-emission source configured to emit a light beam;

a movable mirror configured to reflect the light beam, the movable mirror being swingably supported by a rotary shaft;

a movable mirror driving part that is configured to cause said movable mirror to oscillate in first and second opposite directions; and a variable pixel frequency setting part varying, in accordance with an amplitude of said movable mirror, a frequency causing said light-emission source to emit light based on pixel information.

72. The optical scanning device as claimed in claim 71, wherein said light-emission source is modulated in accordance with image data; and said movable mirror driving part causes said movable mirror to oscillate by periodically generating attraction or a repulsive force between said support substrate and said movable mirror by switching voltages applied to said movable mirror driving part, said movable mirror driving part being provided on both of end parts of said movable mirror, the end parts being positioned on opposite sides of each of the rotary shaft.

73. The optical scanning device as claimed in claim 72, wherein the light beam emitted from said light-emission source of each of said optical scanning modules is caused to scan a region in the primary scanning direction by said movable mirror so that image recording is performed by connecting the regions scanned by the light beams of said scanning modules.

74. The optical scanning device as claimed in claim 73, further comprising beam detection parts each configured to detect a position of the light beam deflected by said movable mirror, the beam detection parts being provided outside the scanned region at positions corresponding to scanning starting and termination ends of each of the optical scanning modules, respectively, wherein said variable pixel frequency setting part varies the pixel frequency based on a scanning period between detections of the light beam by the beam detection parts.

75. The optical scanning device as claimed in claim 73, wherein said variable pixel frequency setting part varies the pixel frequency in a plurality of steps during one scan.

76. The optical scanning device as claimed in claim 73, further comprising a variable driving current setting part that varies, in accordance with the pixel frequency, a driving current supplied to said light-emission source so as to vary an amount of light emitted therefrom.

77. The optical scanning device as claimed in claim 73, further comprising a beam detection part configured to detect a position of the light beam deflected by said movable mirror, the beam detection part being provided outside the scanned region at a position corresponding to a scanning starting end of each of the optical scanning modules, wherein one of a plurality of detection signals output from the beam detection part is selected as a reference signal for starting image writing in accordance with an on-off timing of the driving voltages applied to said movable mirror driving part.

78. The optical scanning device as claimed in claim 73, further comprising a beam detection part configured to detect a position of the light beam deflected by said movable mirror, the beam detection part being provided outside the scanned region of each of the optical scanning modules, wherein the light beam is turned within a region detectable by said beam detection part so as to perform scanning in the first and second opposite directions.

79. The optical scanning device as claimed in claim 73, wherein the optical scanning modules are arranged so that the scanned regions of each adjacent two of the optical scanning modules are apart from each other by one scanning pitch in a secondary scanning direction; and timing phases of the driving voltages applied to the movable mirror driving parts of the optical scanning modules coincide substantially.

80. The optical scanning device as claimed in claim 73, further comprising a pair of buffer parts configured to alternate in temporarily storing the image data so that each of the buffer parts is configured to store image data for every other scanning line, wherein the light beam emitted from said light-emission source is deflected by said movable mirror so as to scan the scanned region in the first and second opposite directions; and the image data is read out alternately from the paired buffer parts in first and second respective orders reverse to each other based on timing of the driving voltages applied to said movable mirror driving part.

81. An optical scanning device comprising:

a plurality of optical scanning modules arranged so that primary scanning directions thereof coincide with each other, the optical scanning modules each comprising:

a light-emission source configured to emit a light beam;

a movable mirror configured to reflect the light beam, the movable mirror being swingably supported by a rotary shaft; and a movable mirror driving part that is configured to cause said movable mirror to oscillate in first and second opposite directions, wherein a light emission period forming one pixel on a scanned surface is varied with respect to a primary scanning direction to be minimized in a vicinity of a center of an image so that a light-emission interval between each of pixels forming pixel information is minimized in the vicinity of the center of the image.

82. The optical scanning device as claimed in claim 81, wherein said light-emission source is modulated in accordance with image data; and said movable mirror driving part causes said movable mirror to oscillate by periodically generating attraction or a repulsive force between said support substrate and said movable mirror by switching voltages applied to said movable mirror driving part, said movable mirror driving part being provided on both of end parts of said movable mirror, the end parts being positioned on opposite sides of each of the rotary shaft.

83. The optical scanning device as claimed in claim 82, wherein the light beam emitted from said light-emission source of each of said optical scanning modules is caused to scan a region in the primary scanning direction by said movable mirror so that image recording is performed by connecting the regions scanned by the light beams of said optical scanning modules.

84. The optical scanning device as claimed in claim 83, further comprising a variable pixel frequency setting part that is configured to vary the pixel frequency modulating said light-emission source in accordance with an amount of oscillation of said movable mirror.

85. The optical scanning device as claimed in claim 84, further comprising beam detection parts each configured to detect a position of the light beam deflected by said movable mirror, the beam detection parts being provided outside the scanned region at positions corresponding to scanning starting and termination ends of each of the optical scanning modules, respectively, wherein said variable pixel frequency setting part varies the pixel frequency based on a scanning period between detections of the light beam by the beam detection parts.

86. The optical scanning device as claimed in claim 84, wherein said variable pixel frequency setting part varies the pixel frequency in a plurality of steps during one scan.

87. The optical scanning device as claimed in claim 84, further comprising a variable driving current setting part that varies, in accordance with the pixel frequency, a driving current supplied to said light-emission source so as to vary an amount of light emitted therefrom.

88. The optical scanning device as claimed in claim 83, further comprising a beam detection part configured to detect a position of the light beam deflected by said movable mirror, the beam detection part being provided outside the scanned region at a position corresponding to a scanning starting end of each of the optical scanning modules, wherein one of a plurality of detection signals output from the beam detection part is selected as a reference signal for starting image writing in accordance with an on-off timing of the driving voltages applied to said movable mirror driving part.

89. The optical scanning device as claimed in claim 83, further comprising a beam detection part configured to detect a position of the light beam deflected by said movable mirror, the beam detection part being provided outside the scanned region of each of the optical scanning modules, wherein the light beam is turned within a region detectable by said beam detection part so as to perform scanning in the first and second opposite directions.

90. The optical scanning device as claimed in claim 83, wherein the optical scanning modules are arranged so that the scanned regions of each adjacent two of the optical scanning modules are apart from each other by one scanning pitch in a secondary scanning direction; and timing phases of the driving voltages applied to the movable mirror driving parts of the optical scanning modules coincide substantially.

91. The optical scanning device as claimed in claim 83, further comprising a pair of buffer parts configured to alternate in temporarily storing the image data so that each of the buffer parts is configured to store image data for every other scanning line, wherein the light beam emitted from said light-emission source is deflected by said movable mirror so as to scan the scanned region in the first and second opposite directions; and the image data is read out alternately from the paired buffer parts in first and second respective orders reverse to each other based on timing of the driving voltages applied to said movable mirror driving part.

* * * * *